United States Patent
Ceder et al.

(10) Patent No.: US 12,278,365 B2
(45) Date of Patent: Apr. 15, 2025

(54) FLUORINE SUBSTITUTED CATION-DISORDERED LITHIUM METAL OXIDES AND METHODS OF MAKING SAME

(71) Applicant: THE REGENTS OF THE UNIVERSITY OF CALIFORNIA, Oakland, CA (US)

(72) Inventors: Gerbrand Ceder, Orinda, CA (US); Jinhyuk Lee, Walnut Creek, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 522 days.

(21) Appl. No.: 16/500,666

(22) PCT Filed: Apr. 5, 2018

(86) PCT No.: PCT/US2018/026189
§ 371 (c)(1),
(2) Date: Oct. 3, 2019

(87) PCT Pub. No.: WO2018/187531
PCT Pub. Date: Oct. 11, 2018

(65) Prior Publication Data
US 2020/0194790 A1 Jun. 18, 2020

Related U.S. Application Data

(60) Provisional application No. 62/483,112, filed on Apr. 7, 2017.

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/42* (2013.01); *H01M 10/0525* (2013.01);
(Continued)

(58) Field of Classification Search
CPC .............................. H01M 4/525; H01M 4/582
See application file for complete search history.

(56) References Cited

U.S. PATENT DOCUMENTS 7,205,072 B2   4/2007  Kang et al.
9,178,216 B2   11/2015 Wang et al.
(Continued)

FOREIGN PATENT DOCUMENTS

CN   102368547   3/2012
CN   102790201   11/2012
(Continued)

OTHER PUBLICATIONS

STIC partial translation of Japanese priority document JP6575919B (Year: 2017).*
(Continued)

*Primary Examiner* — Nathanael T Zemui
(74) *Attorney, Agent, or Firm* — Smith, Gambrell & Russell, LLP

(57) ABSTRACT

The present invention relates to fluorine substituted cation-disordered lithium metal oxides for high capacity lithium-ion battery electrodes suitable for use in lithium-ion rechargeable batteries having a general formula: $Li_{1+x}M_{1-x}O_{2-y}F_y$, wherein $0.05 \leq x \leq 0.3$ and $0 < y \leq 0.3$ and M is a transition metal, such as Ti, V, Cr, Mn, Fe, Co, Ni, Zr, Nb, Mo, Sn, Sb, and combinations thereof. The fluorine-substituted cation-disordered materials of the present invention demonstrate improved electrochemical performance, show-
(Continued)

ing high capacity and high voltage. The present invention also relates to methods of making the fluorine-substituted cation-disordered materials.

30 Claims, 15 Drawing Sheets

(51) Int. Cl.
  *C01G 53/42* (2025.01)
  *H01M 4/02* (2006.01)
  *H01M 10/0525* (2010.01)
(52) U.S. Cl.
  CPC ...... *C01P 2002/72* (2013.01); *C01P 2002/76* (2013.01); *C01P 2002/85* (2013.01); *C01P 2006/40* (2013.01); *H01M 2004/021* (2013.01); *H01M 2004/028* (2013.01); *H01M 2220/30* (2013.01)

(56) References Cited

U.S. PATENT DOCUMENTS

| | | | |
|---|---|---|---|
| 10,340,513 B2 | 7/2019 | Sugiura | |
| 10,978,706 B2 | 4/2021 | Ceder et al. | |
| 11,791,463 B2 | 10/2023 | Ceder et al. | |
| 2004/0091779 A1 | 5/2004 | Kang et al. | |
| 2004/0213729 A1* | 10/2004 | Suhara | C01G 51/42 |
| | | | 423/594.6 |
| 2010/0086854 A1 | 4/2010 | Kumar et al. | |
| 2014/0099549 A1* | 4/2014 | Ceder | H01M 4/624 |
| | | | 429/220 |
| 2015/0089797 A1 | 4/2015 | Binder et al. | |
| 2016/0049640 A1 | 2/2016 | Takeuchi et al. | |
| 2018/0034042 A1* | 2/2018 | Carroll | H01M 4/485 |
| 2018/0090747 A1 | 3/2018 | Natsui et al. | |
| 2018/0138496 A1* | 5/2018 | Ikeuchi | C01G 51/42 |
| 2018/0205073 A1 | 7/2018 | Natsui et al. | |
| 2018/0351174 A1* | 12/2018 | Paulsen | C01G 53/50 |
| 2020/0020943 A1* | 1/2020 | Natsui | C01B 33/32 |
| 2020/0194790 A1 | 6/2020 | Ceder et al. | |

FOREIGN PATENT DOCUMENTS

| | | |
|---|---|---|
| EP | 2 921 455 A1 | 9/2015 |
| EP | 3 136 478 | 3/2017 |
| EP | 3 595 058 A1 | 1/2020 |
| JP | 2003-187801 A | 7/2003 |
| JP | 2015-128023 A | 7/2015 |
| JP | 2016-025010 A | 2/2016 |
| JP | 2016-103456 A | 6/2016 |
| JP | 2018-116930 A | 7/2018 |
| JP | 2018-535904 A | 12/2018 |
| JP | 2019-523532 A | 8/2019 |
| JP | 2020-515501 A | 5/2020 |
| JP | 2020-534234 A | 11/2020 |
| WO | 99/60638 A2 | 11/1999 |
| WO | 2014/156153 A1 | 10/2014 |
| WO | 2017/013848 A1 | 1/2017 |
| WO | 2018/022989 A1 | 2/2018 |

OTHER PUBLICATIONS

Japanese priority document JP2017041776 (Year: 2017).*
Lee et.al; "A new class of high capacity cation-disordered oxides for rechargeable lithium batteries: Li—Ni—Ti—Mo oxides" (Year: 2015).*
Extended European Search Report of European Patent Application No. 18781796.0 (7 pages), dated Dec. 14, 2020.
International Preliminary Report on Patentability mailed Oct. 8, 2019 in International Patent Application No. PCT/EP2018/026189 (6 pages).
International Search Report issued Jul. 16, 2018 in International Patent Application No. PCT/US2018/26189 (2 pages).
Written Opinion of the International Searching Authority issued Jul. 16, 2018 in International Patent Application No. PCT/US2018/26189 (5 pages).
Kubo, K., et al. Synthesis and electrochemical properties for $LiNiO_2$ substituted by other elements. Journal of Power Sources. 1997. vol. 68, No. 2, pp. 553-557.
Ren, S., et al. Improved Voltage and Cycling for $Li^+$ Intercalation in High-Capacity Disordered Oxyfluoride Cathodes. Advanced Science. 2015, vol. 2, pp. 1-6.
Lee, S.H., et al. Enhancing phase stability and kinetics of lithium-rich layered oxide for an ultra-high performing cathode in Li-ion batteries. Journal of Power Sources. 2015. vol. 281, pp. 77-84.
Kubo, K., et al. Synthesis and charge-discharge properties of $Li_{1+x}Ni_{1-x-y}Co_yO_2-_zF_z$. Journal of Power Sources. 1999. vol. 81-82, pp. 599-603.
Kang, B. et al. Battery materials for ultrafast charging and discharging. Nature. 2009. vol. 458. pp. 190-193.
Barpanda, P. et al. A 3.90 V iron-based fluorosulphate material for lithium-ion batteries crystallizing in the triplite structure. Nature Materials. 2011. vol. 10. pp. 772-779.
Kang, K. et al. Electrodes with High Power Capacity for Rechargeable Lithium Batteries, Science. 2006. vol. 311. pp. 977-980.
Lee, J. et al. Unlocking the Potential of Cation-Disordered Oxides for Rechargeable Lithium Batteries. Science. 2014. vol. 343. pp. 519-522.
Yabuuchi, N. et al. High-capacity electrode materials for rechargeable lithium batteries: $Li_2NbO_4$-based system with cation-disordered rocksalt structure. Proceedings of the National Academy of Science. 2015. vol. 112. pp. 7650-7655.
Glazier, S. et al. Characterization of Disordered $Li_{(1+x)}Ti_{2x}Fe_{(1-3x)}O_2$ as Positive Electrode Materials in Li-Ion Batteries Using Percolation Theory. Chemistry of Materials. 2015. vol. 27. pp. 7751-7756.
Lee, J., et al. A new class of high capacity cation-disordered oxides for rechargeable lithium batteries: Li—Ni—Ti—Mo oxides. Energy & Environmental Science. 2015. vol. 8. No. 11. pp. 3255-3265.
Urban, A. et al. The Configurational Space of Rocksalt-Type Oxides for High-Capacity Lithium Battery Electrodes. Advanced Energy Materials. 2014. vol. 4. No. 1400478. pp. 1-9.
Office Action dated Jan. 20, 2022 for Japanese Patent Application No. 2019-554350 (9 pages in Japanese with 9 page English translation).
Office Action dated Apr. 26, 2022 for Chinese Patent Application No. 201880023322.4 (8 pages in Japanese, with 10 page English translation).
Office Action dated Oct. 24, 2022 for Chinese Patent Application No. 201880023322.4 (9 pages in Chinese, with 11 page English translation).
Office Action dated Oct. 6, 2022 for Japanese Patent Application No. 2019-554350 (4 pages in Japanese, with 5 page English translation).
Office Action dated Feb. 24, 2023 for Chinese Patent Application No. 201880023322.4 (7 pages in Chinese, with 15 page English translation).
Reconsideration Report by Examiner dated Mar. 28, 2023 for Japanese Patent Application No. 2019-554350 (3 pages in Japanese, with 3 page English translation).
Office Action dated Apr. 1, 2023 for Korean Patent Application No. 10-2019-7032948 (7 pages in Korean with 7 page English translation).
Search Report dated Apr. 22, 2022 for Chinese Patent Application No. 201880023322.4 (2 pages).
Final Office Action dated Oct. 25, 2023 for Korean Patent Application No. 10-2019-7032948 (4 pages in Korean; 4 pages English Translation).
First Office Action dated Mar. 14, 2024 for Japanese Patent Application No. 2023-015390 (8 pages in Japanese; 9 pages English Translation).
Notification of Reexamination dated Mar. 22, 2024 for Chinese Patent Application No. 201880023322.4 (7 pages in Chinese; 8 pages English Translation).

(56) References Cited

OTHER PUBLICATIONS

Appeal Decision dated Feb. 22, 2024 for Japanese Patent Application No. 2019-554350 (2 pages in Japanese; 2 pages English Translation).

Notice of Final Rejection and Decision of Refusal of Amendment dated Apr. 10, 2024 for Korean Patent Application No. 10-2019-7032948 (7 pages in Korean; 5 pages English Translation).

Chen, Ruiyong, et al. Disordered Lithium-Rich Oxyfluoride as a Stable Host for Enhanced Li+ Intercalation Storage. 2015. Advanced Energy Materials. vol. 5, No. 9, pp. 1-7.

Croguennec, L., et al. Synthesis of "$Li_{1.1}(Ni_{0.425}Mn_{0.425}Co_{0.15})_{0.9}O_{1.8}F_{0.2}$" Materials by Different Routes: Is There Fluorine Substitution for Oxygen? Journal of The Electrochemical Society. 2009. vol. 156, No. 5, pp. A349-A355.

Lee, Jinhyuk, et al. Mitigating oxygen loss to improve the cycling performance of high capacity cation-disordered cathode materials. Nature Communications. 2017. vol. 8, No. 1, pp. 1-10.

Reexamination Decision mailed Jun. 27, 2024 for Chinese Patent Application No. 201880023322.4 (12 pages in Chinese; 6 pages English Translation).

\* cited by examiner

FLUORINE SUBSTITUTED CATION-DISORDERED LITHIUM METAL OXIDES AND METHODS OF MAKING SAME

FIELD OF THE INVENTION

The present invention relates to fluorine substituted cation-disordered lithium metal oxides for high capacity lithium-ion battery electrodes and methods of making same.

BACKGROUND OF THE INVENTION

Lithium-ion ("Li-ion") batteries are one of the most investigated energy storage devices due to their relatively high energy and high power performances. With increasing demand for high-performance Li-ion batteries, cathode materials with high energy density have been sought from diverse chemical spaces. In particular, oxide materials have drawn the most attention because they tend to deliver the highest energy density among all cathode materials.

More specifically, layered lithium transition metal oxides, such as $LiCoO_2$, have been one of the most important classes of cathode materials for rechargeable lithium batteries. In these materials, lithium and transition metal ions are well-segregated to form distinct layers which alternate in their crystal structure. In these ordered compounds, Li sites and pathways (a 2D slab in the layered oxides) are separated from the transition metal sublattice, which provides stability and electron storage capacity. FIG. 1 provides a schematic diagram of the layered-rocksalt structure, Li-M-O. Having well-ordered structures where there is little or no intermixing between the Li and the transition metal sublattice is generally considered important for obtaining high-capacity cathode materials with good cycle life. Indeed, the well-layeredness in their structure has been considered necessary for high lithium mobility in the materials, and cation mixing has been observed to result in poor cyclability by slowing down lithium diffusion. These observations may have led researchers to disregard cation-disordered lithium transition metal oxides as promising cathode materials.

Recently, important understandings have been made in the oxide space that enlarges the search space of high energy density cathode materials. Specifically, cation-disordered lithium transition metal oxides ("Li-TM oxides"), which were generally considered electrochemically inactive due to limited Li diffusion by their disordered structure, can be promising cathode materials if provided with enough Li excess (i.e., where the number of Li sites is greater than that of TM sites (x>0.09 in $Li_{1+x}TM_{1-x}O_2$)). Indeed, facile Li diffusion is possible in disordered structures once enough excess Li is introduced, which, in turn, introduces a percolating network of facile Li diffusion channels (0-TM channels) through which Li diffusion can be facile in the disordered structure due to weak electrostatic repulsion on the activated Li+ ion upon Li diffusion by the lack of repulsive TM ions.

However, cation disorder/cation mixing still presents numerous difficulties and challenges in providing high energy density cathode materials. For instance, oxygen oxidation, which is often necessary to achieve high capacity from disordered materials, can trigger oxygen loss via lattice densification, which degrades 0-TM percolation (and hence Li diffusion) in the disordered materials by reducing the Li-excess level, especially near the surface. Thus, nearly all cation-disordered Li-TM oxides whose TM redox (for example, $Fe^{2+/4+}$, $Ni^{2+/4+}$, $Co^{2+/4+}$) overlaps with oxygen redox suffer from large polarization after oxygen loss, showing limited cyclability. Additionally, oxygen loss can also lead to resistive surface layers, such as the layer of $Li_2CO_3$, which can further add impedance to the cathode.

One previously reported strategy for improving the stability of layered (rocksalt) materials is described in U.S. Pat. No. 7,205,072 to Kang et al. Kang describes a fluorine substitution strategy on layered lithium nickel-manganese-cobalt based oxide materials that improves the structural stability of the layered (rocksalt) materials against disorder. The structure selection between layered rocksalt and cation-disordered rocksalt structures depends highly on the composition of materials. The fluorine substituted lithium nickel-manganese-cobalt oxides that are discussed in Kang exclusively form into a layered rocksalt structure based on the compositional make-up and the oxidation states of the elements included in the composition. Kang does not discuss the role of fluorine substitution on the structural integrity of cation-disordered structures.

Accordingly, there remains a need for cation-disordered lithium transition metal oxides having improved electrochemical performances for use as cathode materials.

SUMMARY OF THE INVENTION

The present invention is directed to a lithium metal oxide having a general formula: $Li_{1+x}M_{1-x}O_{2-y}F_y$, said lithium metal oxide having a cation-disordered rocksalt structure, wherein $0.05 \leq x \leq 0.3$ and $0 < y \leq 0.3$ and M is a transition metal. In one embodiment, the general formula may include $0.09 \leq x \leq 0.3$ and $0.10 \leq y \leq 0.25$. In another embodiment, M is selected from the group consisting of Ti, V, Cr, Mn, Fe, Co, Ni, Zr, Nb, Mo, Sn, Sb, and combinations thereof. For example, M may be selected from the group consisting of Mo, Ni, Ti, and combinations thereof. In still another embodiment, the lithium metal oxide of the present invention may have the general formula: $Li_{1+x}Ni_aTi_bMo_{1-x-a-b}O_{2-y}F_y$, wherein $0.2 \leq a \leq 0.6$ and $0.2 \leq b \leq 0.6$.

The lithium metal oxides of the present invention may have a cation-disordered rocksalt structure characterized by a crystallographic space group $Fm\bar{3}n$ and an average particle size of about 100 nm to about 180 nm. In one embodiment, the lithium metal oxides have a discharge capacity of about 180 mAh/g to about 330 mAh/g and an average discharge voltage of at least 3.0 V.

The present invention is also directed to a process for manufacturing a lithium metal oxide having a general formula: $Li_{1+x}M_{1-x}O_{2-y}F_y$, said lithium metal oxide having a cation-disordered rocksalt structure, wherein $0.05 \leq x \leq 0.3$ and $0 < y \leq 0.3$ and M is a transition metal, for example, Ti, V, Cr, Mn, Fe, Co, Ni, Zr, Nb, Mo, Sn, Sb or combinations thereof, including the steps of: providing a lithium-based precursor, a transition metal (M)-based precursor, and a fluorine-based precursor; dispersing said lithium-based, transition metal-based, and fluorine-based precursors in an organic solvent so as to obtain a precursor slurry; milling said precursor slurry, preferably so as to obtain an average particle size of about 100 nm to about 180 nm; drying and pelletizing said precursor slurry; and firing said precursor slurry at a temperature of at least 600° C. in the presence of oxygen.

In one embodiment, stoichiometric amounts of said lithium-based, transition metal-based, and fluorine-based precursors are dispersed into the solvent. The lithium-based precursor may be $Li_2CO_3$ and the fluorine-based precursor may be LiF. In another embodiment, the organic solvent is selected from acetone or ethanol. In still another embodiment, the step of milling may be selected from the group consisting of ball milling, shaker milling, and high energy ball milling. The precursor slurry may be fired at a temperature of at least 700° C. for about 10 hours in the presence of oxygen.

The present invention is further directed to a positive electrode material including a lithium metal oxide according to the present invention. The present invention also relates to a lithium-ion battery, including a negative electrode material; an electrolyte; and a positive electrode material including a lithium metal oxide according to the present invention. The lithium-ion battery of the present invention may be used in a portable electronic device, an automobile, or an energy storage system.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

The present invention is directed to fluorine substituted cation-disordered lithium metal oxides ("Li-M oxide"). Without being bound to any particular theory, it is believed that fluorine substitution for oxygen in the cation-disordered lithium metal oxide materials can improve electrochemical performance of the materials by alleviating oxygen loss upon cycling. Oxygen loss is known to degrade the electrochemical performances of Li-M oxide materials by triggering cation-densification, which decreases the Li-excess level (x in $Li_{1+x}TM_{1-x}O_{2-y}F_y$) that is necessary for facile lithium diffusion in disordered Li-excess materials.

It is believed that fluorination can improve the transition metal redox by increasing the redox-active transitional metal contents in the disordered Li-excess materials, thereby preventing too much oxygen redox upon high delithiation, leading to less oxygen loss. In other words, the fluorine substitution suppresses oxygen loss, which in turn leads to improved cycling performances of Li-excess disordered cathode materials. Indeed, alleviating oxygen loss from disordered Li-excess compounds via fluorine substitution substantially improves cycling performance by reducing the polarization upon charging and discharging. Accordingly, the fluorine-substituted materials of the present invention show high capacity and high voltage, which could not be achieved by other types of Ni-redox based (or Co, Fe-redox based) cation-disordered cathode materials.

The present invention provides for fluorine substituted cation-disordered lithium metal oxides ("Li-M oxides"). In one embodiment, the Li-M oxides of the present invention include a cation-disordered rocksalt structure. Indeed, the Li-M oxides discussed herein exclusively form into disordered rocksalt structures. As used herein, a cation-disordered rocksalt structure refers to a structure characterized by the crystallographic space group, Fm3̄m. In the cation-disordered rocksalt structure of the present invention, lithium and transition metals may randomly occupy the vacant octahedral sites in the face centered cubic ("FCC") framework of oxygen and fluorine is substituted for oxygen. The substituted fluorine is randomly distributed in the FCC framework along with the oxygen. In another embodiment, the cation-disordered rocksalt structure may include interweaving FCC structures: one made of anions, such as oxygen and fluorine, and the other made of randomly distributed lithium and transition metals.

Figure 1:
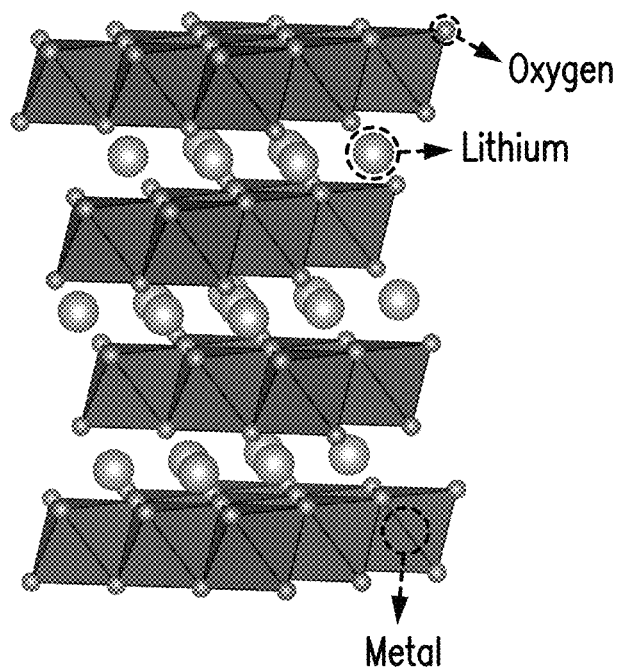
FIG. 1 is a schematic diagram of a layered-rocksalt structure.
Figure 2:
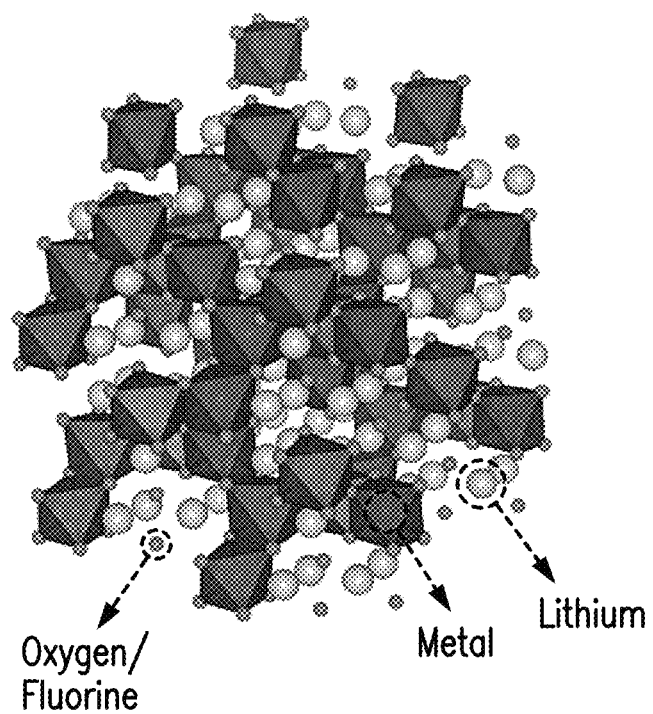
FIG. 2 is a schematic diagram of a disordered-rocksalt structure according to one embodiment of the present invention.

The cation-disordered rocksalt structures of the present invention provide for the substitution of oxygen for fluorine. As discussed above, the substituted fluorine shares the FCC framework of oxygen and is randomly distributed along with oxygen. Indeed, the disordered Li-M oxides of the present invention are completely cation-mixed, i.e., cation-mixing of 100 percent. FIG. 2 shows a cation-disordered rocksalt structure contemplated by the present invention. As can be seen in FIG. 2, the distribution of the oxygen/fluorine, lithium, and transition metal in the rocksalt structure is completely random.

In one embodiment, the Li-M oxides of the present invention may form as a layered rocksalt and transform to a disordered rocksalt upon charge-discharge cycling. In another embodiment, the Li-M oxides of the present invention initially form as disordered rocksalt materials. However, the present invention contemplates the use of cation-disordered Li-M oxides as a final composition.

In one embodiment, the Li-M oxides of the present invention have general formula (1):

$$Li_{1+x}M_{1-x}O_{2-y}F_y \qquad (1)$$

where $0.05 \le x \le 0.3$ and $0 < y \le 0.3$. In this aspect, general formula (1) may be defined as $0.09 \le x \le 0.3$ and $0.10 \le y \le 0.25$. In another aspect, general formula (1) may be defined as $0.1 \le x \le 0.25$ and $0.10 \le y \le 0.15$. According to the present invention, M of general formula (1) may be a transition metal. In one embodiment, M may be chosen from Ti, V, Cr, Mn, Fe, Co, Ni, Zr, Nb, Mo, Sn Sb, or combinations thereof. In another embodiment, M may be chosen from Mo, Ni, Ti, or combinations thereof.

In this aspect, the ratio of Li to M in general formula (1) may range from 1.05:0.95 to 1.3:0.7. For instance, the ratio of Li to M may range from 1.1:0.99 to 1.2:0.8. In another embodiment, the ratio of O to F in general formula (1) may range from 1.99:0.01 to 1.7:0.3. For instance, the ratio of O to F may range from 1.90:0.1 to 1.75:0.25.

In another embodiment, the Li-M oxides of the present invention have general formula (2):

$$Li_{1+x}M_{1-x-y}M'_yO_{2-z}F_z \qquad (2)$$

where $0.05 \le x < 0.3$, $0 \le y < 0.8$, and $0 < z \le 0.3$. In another embodiment, general formula (2) may be defined as $0.05 \le x \le 0.3$, $0 < y \le 0.7$, and $0 < z \le 0.3$. In this aspect, the values of x and y of general formula (2) are defined such that M is greater than or equal to 0. According to the present invention, M of general formula (2) may be a transition metal chosen from V, Cr, Mn, Fe, Co, Ni, Mo, or combinations thereof. In another embodiment, M' may be a transition metal chosen from Ti, Mo, Nb, Sb, Zr, or combinations thereof. In this aspect, M and M' of general formula (2) are defined by different transition metals.

In still another embodiment, the Li-M oxides of the present invention may include lithium nickel titanium molybdenum oxyfluorides. For example, the Li-M oxides of the present invention may have general formula (3):

$$Li_{1+x}Ni_aTi_bMo_{1-x-a-b}O_{2-y}F_y \qquad (3)$$

where $0.05 < x < 0.3$, $0.2 \le a < 0.6$, $0.2 \le b < 0.6$, $0 < y \le 0.3$. In this aspect, the Li-M oxide of general formula (3) may be include the compound, $Li_{1.15}Ni_{0.45}Ti_{0.3}Mo_{0.1}O_{1.85}F_{0.15}$, where $x=0.15$, $a=0.45$, $b=0.3$, $y=0.15$. The Li-M oxide of general formula (3) may also include the compound, $Li_{1.25}Ni_{0.35}Ti_{0.3}Mo_{0.1}O_{1.75}F_{0.25}$, where $x=0.25$, $a=0.35$, $b=0.3$, $y=0.25$.

In yet another embodiment, the Li-M oxides of the present invention may include lithium nickel niobium oxyfluorides. For example, the Li-M oxides of the present invention may have general formula (4):

$$Li_{1+x}Ni_aNb_bO_{2-y}F_y \qquad (4)$$

where $0.05 < x < 0.3$, $0.2 < a < 0.6$, $0.2 < b < 0.6$, $0 < y < 0.3$. For example, the Li-M oxide of general formula (4) may include the compound, $Li_{1.2}Ni_{0.5}Nb_{0.3}O_{1.7}F_{0.3}$, where $x=0.2$, $a=0.5$, $b=0.3$, $y=0.3$.

The Li-M oxides of the present invention may have varying average particle sizes. In one embodiment, the Li-M oxides of the present invention have an average (primary) particle size of about 10 nm to about 10 μm. In another embodiment, the Li-M oxides of the present invention have an average (primary) particle size of about 100 nm to about 200 nm. In another embodiment, the Li-M oxides of the present invention have an average (primary) particle size of about 100 nm to about 180 nm.

The Li-M oxides of the present invention may also have varying lattice parameters. For example, the Li-M oxides of the present invention may have a lattice parameter from about 4.05 Å to about 4.2 Å. In another embodiment, the Li-M oxides of the present invention may have a lattice parameter from about 4.1 Å to about 4.15 Å.

The present invention also includes processes of making the fluorine substituted cation-disordered lithium metal oxides ("Li-M oxides") of the present invention. Various methods may be used for the preparation of the Li-M oxides of the present invention including, but not limited to, a solid state reaction method, an aqueous solution method, or a mechanochemical synthesis. In one embodiment, a solid state reaction method may be employed for the preparation of the Li-M oxides of the present invention. In this aspect, the process for manufacturing the Li-M oxides of the present invention includes a step for providing the necessary precursors for producing the Li-M oxide. For example, the process may include a step for providing at least one lithium-based precursor, at least one transition metal precursor, and at least one fluorine-based precursor. As will be apparent to one of ordinary skill in the art, any precursor that provides the elemental composition of the desired fluorine substituted cation-disordered Li-M oxide may be utilized in the present invention. However, in one embodiment, the lithium-based precursor may include $Li_2CO_3$, $Li_2O$, or LiOH. Similarly, a preferred fluorine-based precursor comprises LiF.

After selection of the desired precursors, stoichiometric amounts of the lithium-based, transition metal-based, and fluorine-based precursors may be dispersed in a solvent so as to obtain a precursor slurry. In one embodiment, the solvent may include any organic solvent including polar or aprotic solvents. Suitable solvents contemplated by the present invention include, but are not limited to, acetone, acetic acid, acetonitrile, benzene, butanol, carbon tetrachloride, diethylene glycol, diethyl ether, ethanol, ethyl acetate, ethylene glycol, isopropanol, methanol, pentane, propanol, toluene, and xylene. In one embodiment, the solvent utilized may be ethanol. In another embodiment, the solvent utilized may be acetone.

Upon forming the precursor slurry, the resulting slurry may then undergo milling. In one embodiment, the resulting slurry may undergo ball milling. In another embodiment, the resulting slurry may undergo shaker milling. In still another embodiment, the resulting slurry may undergo high-energy ball milling to decrease the average primary particle size of the compound. The precursor slurry may undergo milling for about 1 hour to about 50 hours. In another embodiment, the precursor slurry may undergo milling for about 10 hours to about 20 hours. For example, the precursor slurry may undergo milling for about 15 hours.

In this embodiment, after completion of the milling, the precursor slurry may be dried in an oven. The precursor slurry may be dried for about 3 hours to about 50 hours. In another embodiment, the precursor slurry may be dried for about 10 hours to about 20 hours. After drying, the precursor slurry may be pelletized and fired at a temperature of about 400° C. to about 1,200° C. in the presence of oxygen. In another embodiment, the pellets may be fired at a temperature of about 600° C. to about 1,200° C. In still another embodiment, the pellets may be fired at a temperature of about 700° C. to about 1,200° C. The duration of the firing may vary depending on the utilized temperature. In one embodiment, the pellets may be fired for about 30 minutes to about 40 hours. In another embodiment, the pellets may be fired for about 5 hours to about 15 hours. For example, the pellets may be fired at a temperature of 700° C. in the presence of oxygen for 10 hours. After firing, the pellets may be manually ground into fine powder.

The fluorine substituted cation-disordered Li-M oxides described herein provide improved electrochemical performance. The fluorine substitution provided in the cation-disordered Li-M oxides of the present invention results in reduced oxygen loss and polarization, which leads to improved cycling performance. For example, with the reduced oxygen loss, the voltage polarization upon cycling is substantially reduced in the fluorinated Li-M oxides of the present invention when compared to non-fluorinated Li-M oxides. Indeed, the fluorinated Li-M oxides of the present invention demonstrate reduced voltage gaps in the middle of charge and discharge, showing that fluorination reduces polarization. The reduced polarization allows for the delivery of high discharge capacities as well as an increased average discharge voltage. In one embodiment, the fluorinated Li-M oxides of the present invention have a discharge capacity of at least about 180 mAh/g. In another embodiment, the fluorinated Li-M oxides of the present invention have a discharge capacity of at least about 210 mAh/g. For instance, the fluorinated Li-M oxides of the present invention have a discharge capacity of about 180 mAh/g to about 330 mAh/g.

Additionally, the fluorinated Li-M oxides of the present invention have an average discharge voltage of about 2.3 V to about 3.8 V and a discharge energy density of about 500 Wh/kg to about 1,000 Wh/kg. In one embodiment, the fluorinated Li-M oxides of the present invention have an average discharge voltage of at least about 3.0 V, preferably 3.25 V, and a discharge energy density above 750 Wh/kg. The fluorinated Li-M oxides described herein demonstrate much higher discharge capacity above 2.5 V than non-fluorinated Li-M oxides. For instance, the fluorinated Li-M oxides of the present invention deliver a discharge capacity of about 180 mAh/g above 2.5 V. Indeed, the fluorinated Li-M oxides of the present invention deliver a discharge capacity higher than 150 mAh/g at a voltage above 3 V.

Furthermore, the fluorinated Li-M oxides of the present invention show improved capacity retention. In one embodiment, the fluorinated Li-M oxides of the present invention show an improved capacity retention of at least 80% of the initial discharge capacity after 20 cycles between 1.5-4.6 V at 20 mA/g. In another embodiment, the fluorinated Li-M oxides of the present invention show an improved capacity retention of at least about 85% of the initial discharge capacity after 20 cycles between 1.5-4.6 V at 20 mA/g. This improved capacity retention is at least about 3 percent higher than the capacity retention of a non-fluorinated disordered Li-M oxide. Indeed, the capacity retention of the fluorinated Li-M oxides of the present invention is at least about 5 percent higher than the capacity retention of a non-fluorinated disordered Li-M oxide.

Without being bound to any particular theory, it is believed that the improved performance of the fluorinated Li-M oxides of the present invention over non-fluorinated Li-M oxides can be ascribed to the reduced oxygen loss. Indeed, the fluorinated Li-M oxides of the present invention experience oxygen loss at a higher voltage than non-fluorinated Li-M oxides. For example, the evolution of oxygen gas in the fluorinated Li-M oxides of the present invention is delayed to at least 4.4 V (upon a first charge to 4.8 V). In another embodiment, the evolution of oxygen gas in the fluorinated Li-M oxides of the present invention is delayed to at least 4.5 V (upon a first charge to 4.8 V). In still another embodiment, the evolution of oxygen gas in the fluorinated Li-M oxides of the present invention is delayed to at least 4.6 V (upon a first charge to 4.8 V). In this aspect of the invention, the fluorinated Li-M oxides of the present invention experience oxygen loss at a voltage of about 0.15 V higher than non-fluorinated Li-M oxides. For instance, the fluorinated Li-M oxides of the present invention experience oxygen loss at a voltage of about 0.25 V higher than non-fluorinated Li-M oxides.

Figure 3:
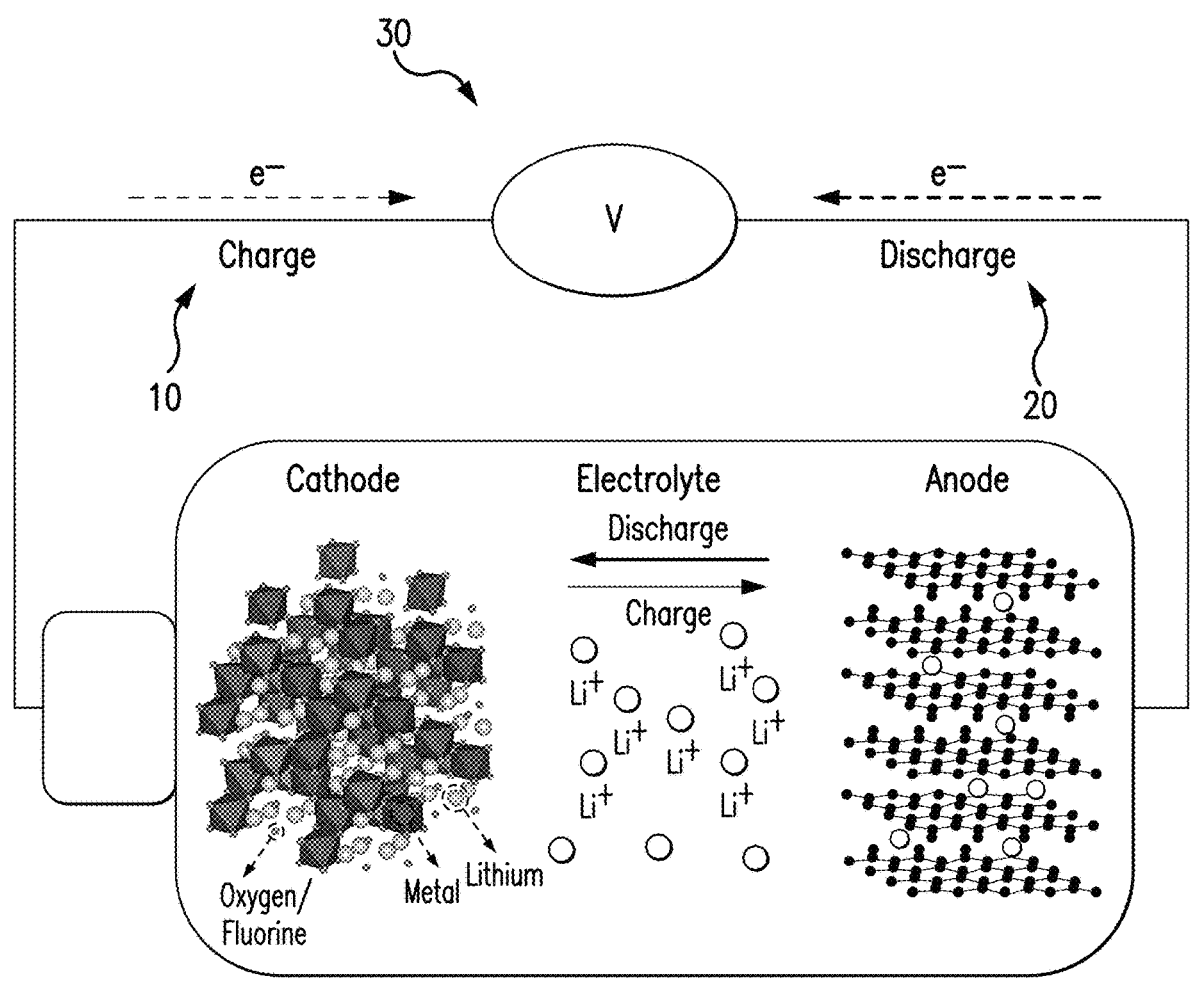
FIG. 3 shows a schematic diagram of a rechargeable lithium-ion battery.

The present disclosure also provides lithium batteries and lithium-ion cells including an electrode material, for example, a cathode, composed of the fluorinated cation-disordered Li-M oxides as described herein. In one embodiment, the fluorine substituted cation-disordered lithium metal oxides produced in accordance with the present invention may be used as cathodes in lithium-ion rechargeable batteries. FIG. 3 shows a schematic diagram of a rechargeable lithium-ion battery. As shown in FIG. 3, reversible shuttling of Li ions between the cathode 10 and the anode 20 enables a rechargeable lithium-ion battery 30. The fluorinated cation-disordered Li-M oxides described herein may be used as cathodes in lithium-ion rechargeable batteries for products such as portable electronic devices, automobiles including electric vehicles and hybrid electric vehicles, and energy storage systems.

EXAMPLES

The following non-limiting examples demonstrate fluorine substituted cation-disordered lithium metal oxides made in accordance with the present invention. The examples are merely illustrative of the preferred embodiments of the present invention, and are not to be construed as limiting the invention, the scope of which is defined by the appended claims.

Example 1

Experimental Procedure

The following inventive fluorine substituted cation-disordered lithium metal oxide was synthesized:

Li—Ni—Ti—Mo—O—F type having the general formula: $Li_{1+x}Ni_aTi_bMo_{1-x-a-b}O_{2-y}F_y$, $0.05<x<0.3$, $0.2<a<0.6$, $0.2<b<0.6$, $0<y\leq0.3$ where x=0.15, a=0.45, b=0.3, y=0.15 ($Li_{1.15}Ni_{0.45}Ti_{0.3}Mo_{0.1}O_{1.85}F_{0.15}$) ("Inventive LNF15").

In preparing the inventive compound, $Li_2CO_3$ (Alfa Aesar, ACS, 99% min), $NiCO_3$ (Alfa Aesar, 99%), $TiO_2$ (Alfa Aesar, 99.9%), $MoO_2$ (Alfa Aesar, 99%), and LiF (Alfa Aesar, 99.99%) were used as precursors. Stoichiometric amounts of precursors were dispersed into acetone and ball-milled for 15 hours, and then dried overnight in an oven. The mixture of precursors was pelletized and then fired at 700° C. for 10 hours in air followed by furnace cooling to room temperature. After firing, the pellets were manually ground into fine powder.

The following comparative cation-disordered lithium metal oxides (without fluorine substitution) were also synthesized:

Li—Ni—Ti—Mo—O type having the general formula: $Li_{1+x/100}Ni_{1/2-x/120}Ti_{1/2-x/120}Mo_{x/150}O_2$, where x=15 ($Li_{1.15}Ni_{0.375}Ti_{0.375}MoO_{0.1}O_2$) ("Comparative LN15"); and Li—Ni—Ti—Mo—O type having the general formula: $Li_{1+x/100}Ni_{1/2-x/120}Ti_{1/2-x/120}Mo_{x/150}O_2$, where x=20 ($Li_{1.2}Ni_{0.333}Ti_{0.333}Mo_{0.1330_2}$) ("Comparative LN20").

In preparing the comparative compounds, $Li_2CO_3$ (Alfa Aesar, ACS, 99% min), $NiCO_3$ (Alfa Aesar, 99%), $TiO_2$ (Alfa Aesar, 99.9%), and $MoO_2$ (Alfa Aesar, 99%) were used as precursors. Stoichiometric amounts of precursors were dispersed into acetone and ball-milled for 15 hours, and then dried overnight in an oven. The mixture of precursors was pelletized and then fired at 750° C. for two hours in air followed by furnace cooling to room temperature. After firing, the pellets were manually ground into fine powder.

To prepare cathode films, the powders of each of Inventive LNF15, Comparative LN15, and Comparative LN20 were separately mixed with carbon black (Timcal, Super P) in a weight ratio of 70:20. Polytetrafluoroethylene (PTFE, DuPont, Teflon 8C) ("PTFE") was added to each mixture as a binder. Each resulting cathode film included the respective Inventive LNF15, Comparative LN15, or Comparative LN20; carbon black; and PTFE in a weight ratio of 70:20:10. The components were manually mixed for 30 minutes and rolled into a thin film inside an argon-filled glove box. In some cases, the lithium metal oxide component was mixed with carbon black using high energy ball-milling (Retsch PM200) for two to six hours at the rate of 300 to 500 rpm. To assemble a cell for regular cycling tests, 1 M of $LiPF_6$ in ethylene carbonate ("EC")-dimethyl carbonate ("DMC") solution (1:1, Techno Semichem), glass microfiber filters (GE Whatman), and Li metal foil (FMC) were used as the electrolyte, the separator, and the counter electrode, respectively. 2032 coin cells were assembled inside an argon-filled glove box and tested on a battery tester (Arbin) at room temperature in galvanostatic modes. The loading density of the cathode film was approximately 5 mg/cm$^2$. The specific capacity was calculated on the amount of the lithium metal oxide component in the cathode film (i.e., 70 wt percent).

X-ray diffraction ("XRD") patterns for as-prepared compounds were collected on a Rigaku MiniFlex (Cu source) in the 2 θ range of 5-85°. Scanning electron microscopy ("SEM") images were collected on a Zeiss Gemini Ultra-55 Analytical Field Emission SEM. Elemental analysis on the compounds was performed with direct current plasma emission spectroscopy (ASTM E1097-12) for Li, Ni, Ti, and Mo. Fluorine contents were determined by ion selective electrode (ASTM D1179-10).

Figure 4A:
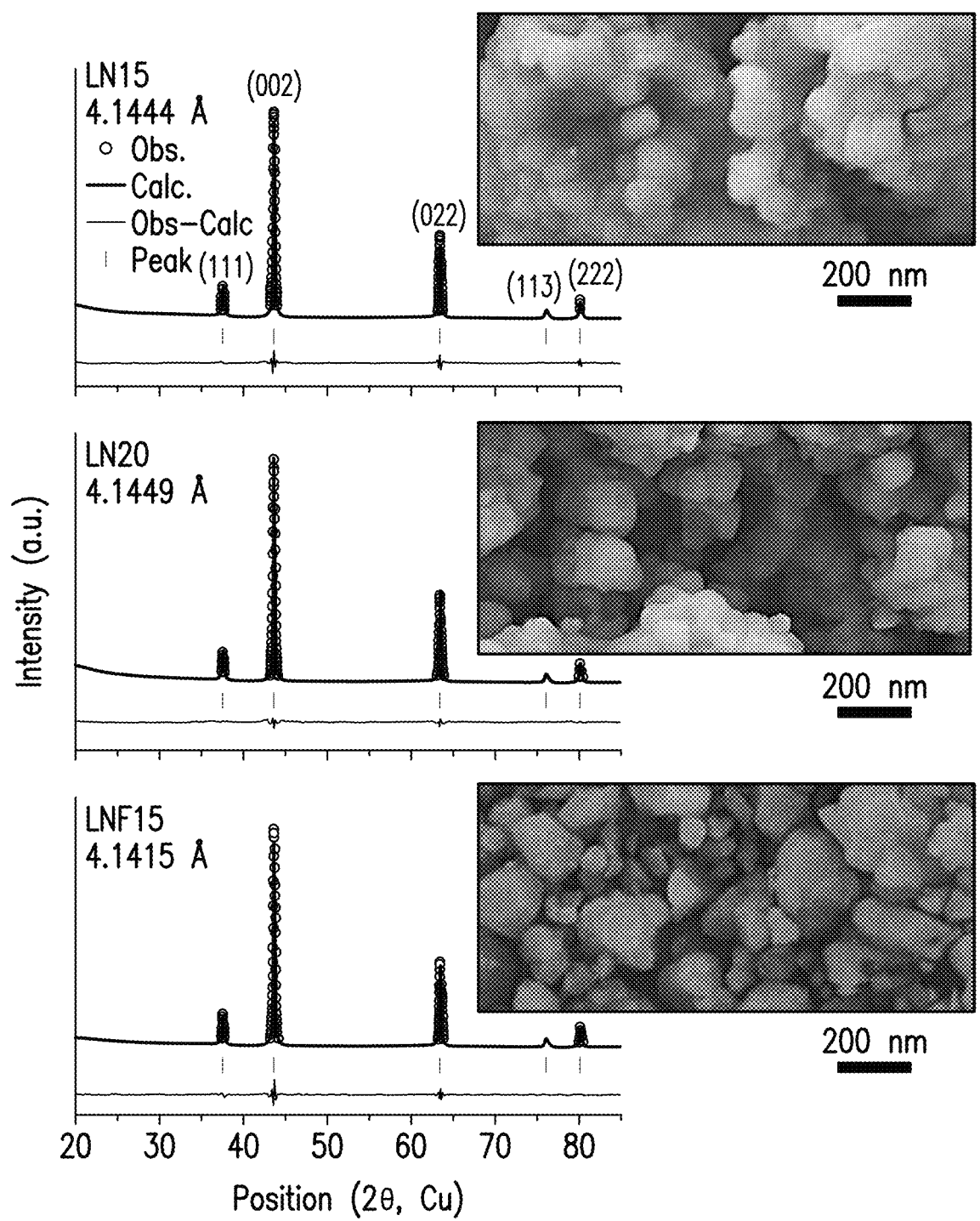
FIG. 4A shows the X-ray diffraction ("XRD") patterns and refinement results of $Li_{1.15}Ni_{0.45}Ti_{0.3}Mo_{0.1}O_{1.85}F_{0.15}$ ("Inventive LNF15"); $Li_{1.15}Ni_{0.375}Ti_{0.375}Mo_{0.102}$ ("Comparative LN15"); and $Li_{1.2}Ni_{0.333}Ti_{0.333}Mo_{0.13302}$ ("Comparative LN20")

FIG. 4A depicts the XRD patterns and refinement results of the Inventive LNF15, Comparative LN15, and Comparative LN20 compounds. FIG. 4A as well as Table 1, presented below, confirm that Li-excess disordered rocksalt phases of oxides (without fluorine substitution) and fluorine-substituted oxides were successfully prepared from the standard solid state reaction. As shown in FIG. 4A, the XRD refinements show that the lattice parameter slightly increases as the Li-excess level increases from 15 (LN15: 4.1444 Å) to 20% (LN20: 4.1449 Å), but decreases slightly with fluorine substitution (LNF15: 4.1415 Å).

TABLE 1

Target vs. measured Li:Ni:Ti:Mo:F atomic ratio of Comparative LN15, Comparative LN20, and Inventive LNF15

| Material | Target Li:Ni:Ti:Mo:F | Measured Li:Ni:Ti:Mo:F |
|---|---|---|
| LN15 | 1.15:0.375:0.375:0.1:0 | 1.338:0.39:0.369:0.103:0 |
| LN20 | 1.2:0.333:0.333:0.1333:0 | 1.18:0.35:0.332:0.137:0 |
| LNF15 | 1.15:0.45:0.3:0.1:0.15 | 1.13:0.464:0.305:0.1:0.142 |

The inset displayed to the right of each XRD pattern in FIG. 4A shows the SEM image of each material. As can be seen in FIG. 4A, the average (primary) particle size of Inventive LNF15 (approximately 180 nm) is larger than that of Comparative LN15 (approximately 100 nm) and Comparative LN20 (approximately 100 nm). For comparison purposes, an additional LNF15 powder having a similar particle size as LN15 and LN20 was prepared. More specifically, high-energy ball-mill at 300 rpm for 4 hours was performed on LNF15 to decrease the average primary particle size of LNF15 to 100 nm. The resulting compound will be referred to herein as "Inventive HB-LNF15."

Figure 4B:
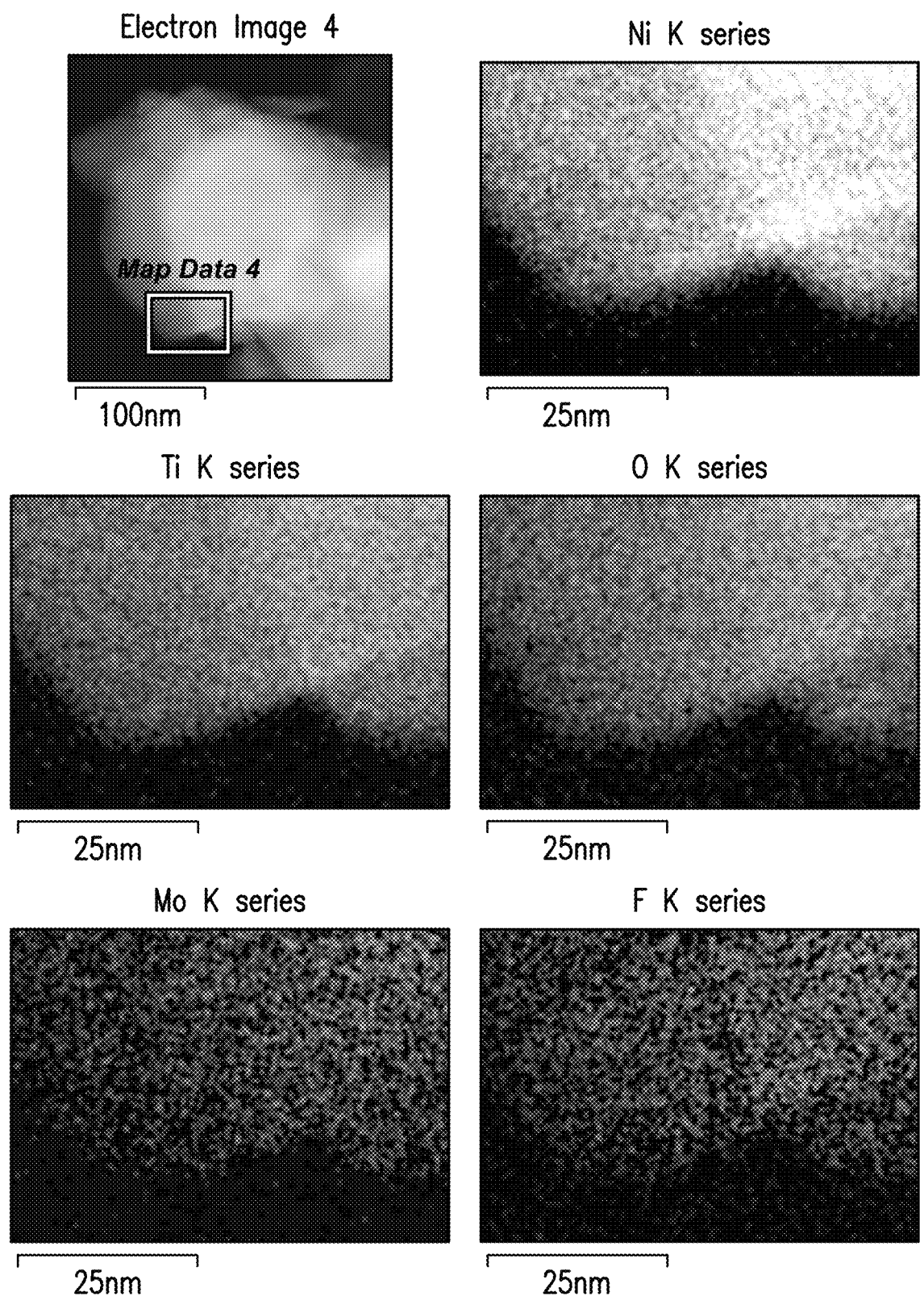
FIG. 4B shows the energy dispersive spectroscopy ("EDS") mapping on the Inventive LNF15 particle.

FIG. 4B shows the energy dispersive spectroscopy ("EDS") mapping (Ni, Ti, O, Mo, F) on the Inventive LNF15 particle. From the EDS mapping, uniform distribution of fluorine and other elements can be seen in the Inventive LNF15 particle. That is, FIG. 4B further confirms that the fluorine is substituted in the disordered lattice instead of forming secondary phases and that the target LNF15 phase was successfully produced.

Galvanostatic Cycling Tests

To compare the electrochemical properties of the Inventive LNF15, Inventive HB-LNF15, Comparative LN15, and Comparative LN20 compounds, galvanostatic cycling tests were performed on each compound. Each compound was cycled between 1.5-4.6 V at 20 mA/g at room temperature.

FIGS. 5A-5D show the initial five-cycle voltage profiles of Comparative LN15 (FIG. 5A), Comparative LN20 (FIG. 5B), Inventive LNF15 (FIG. 5C), and Inventive HB-LNF15 (FIG. 5D) when cycled between 1.5-4.6 V at 20 mA/g at room temperature. The insets of FIGS. 5A-5D show the capacity retention of the materials during 20 cycles. In other words, the insets of FIGS. 5A-5D show the charge and discharge capacity upon repeated cycles.

Figure 5A:
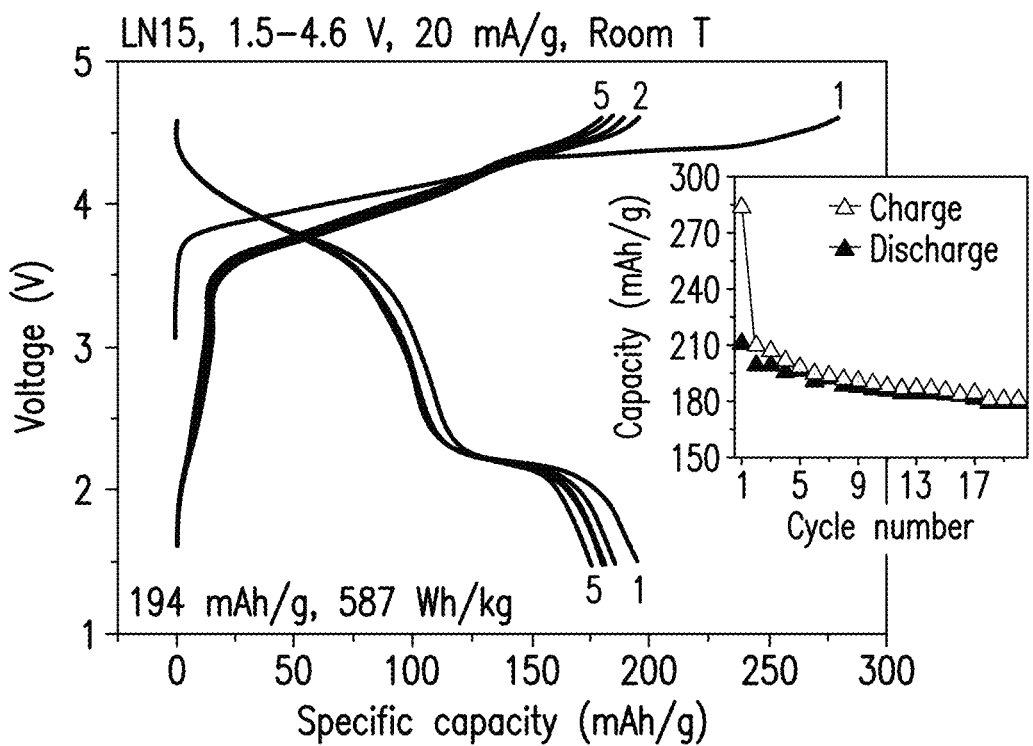
FIGS. 5A-5D show the initial five-cycle voltage profiles of Comparative LN15, Comparative LN20, Inventive LNF15, and Inventive HB-LNF15, respectively, when cycled between 1.5-4.6 V at 20 mA/g at room temperature.
Figure 5B:
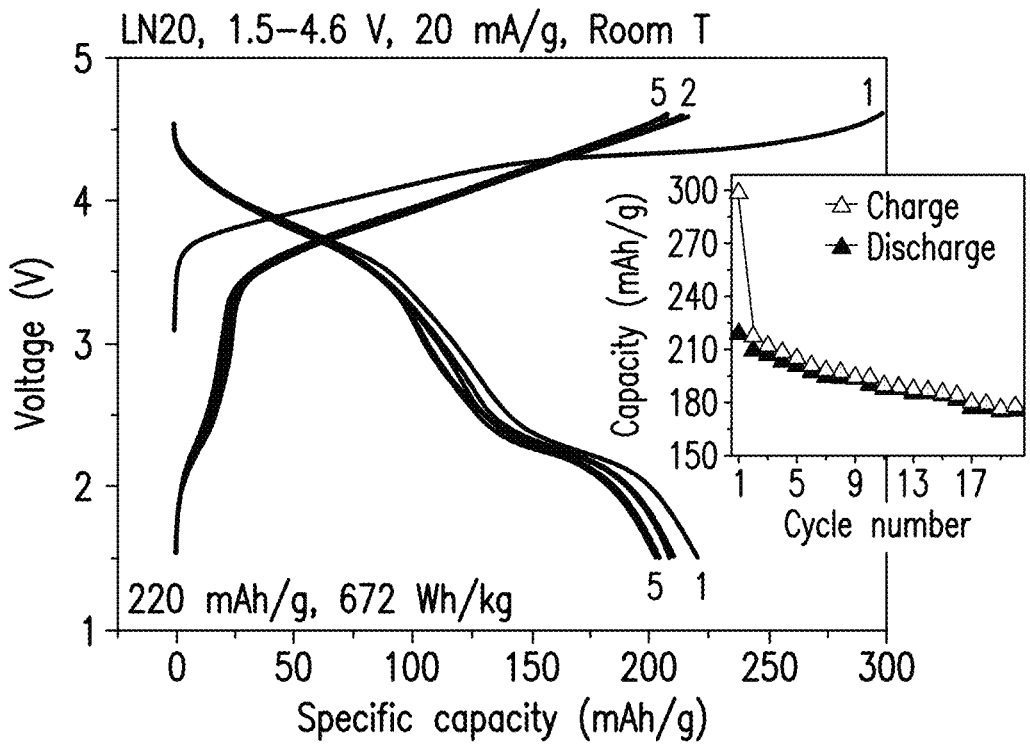

As shown in FIGS. 5A and 5B, at 20 mA/g, both Comparative LN15 and Comparative LN20 can deliver a high discharge capacity up to 194 mAh/g (587 Wh/kg, 2454 Wh/l) and 220 mAh/g (672 Wh/kg, 2775 Wh/l), respectively. However, the voltage profiles of Comparative LN15 and Comparative LN20 show large polarization (voltage gap) between charge and discharge. In addition, a large fraction of discharge comes at a lower voltage than 2.5 V, resulting in the average discharge voltage of approximately 3.03 V and approximately 3.05 V for Comparative LN15 and Comparative LN20, respectively.

Figure 5C:
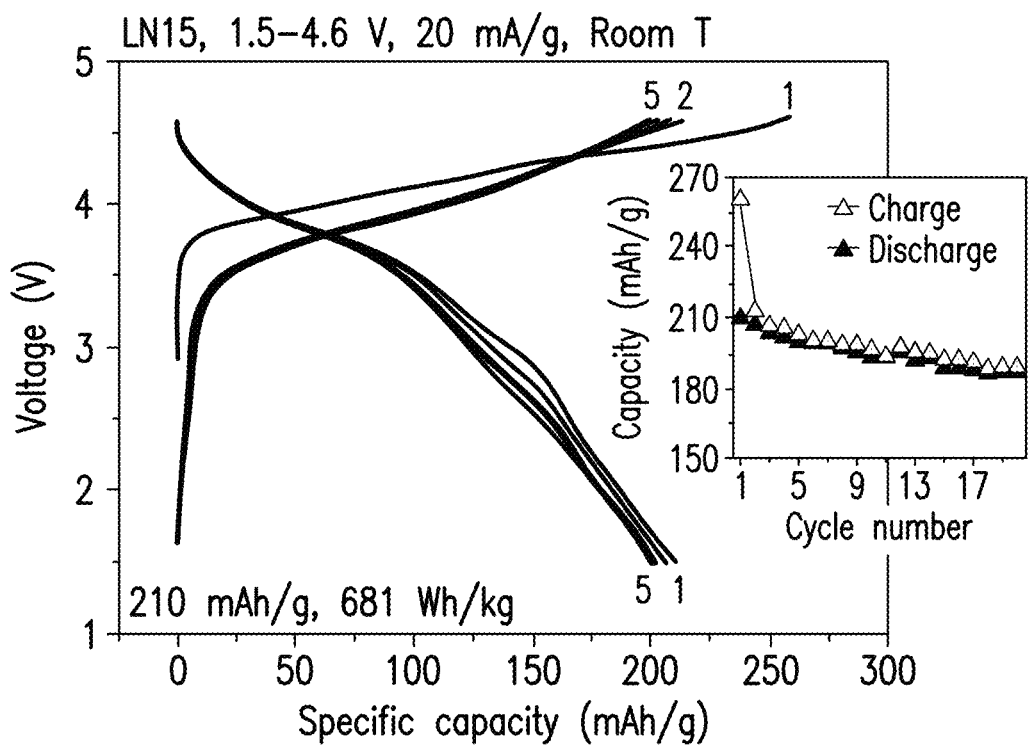
Figure 5D:
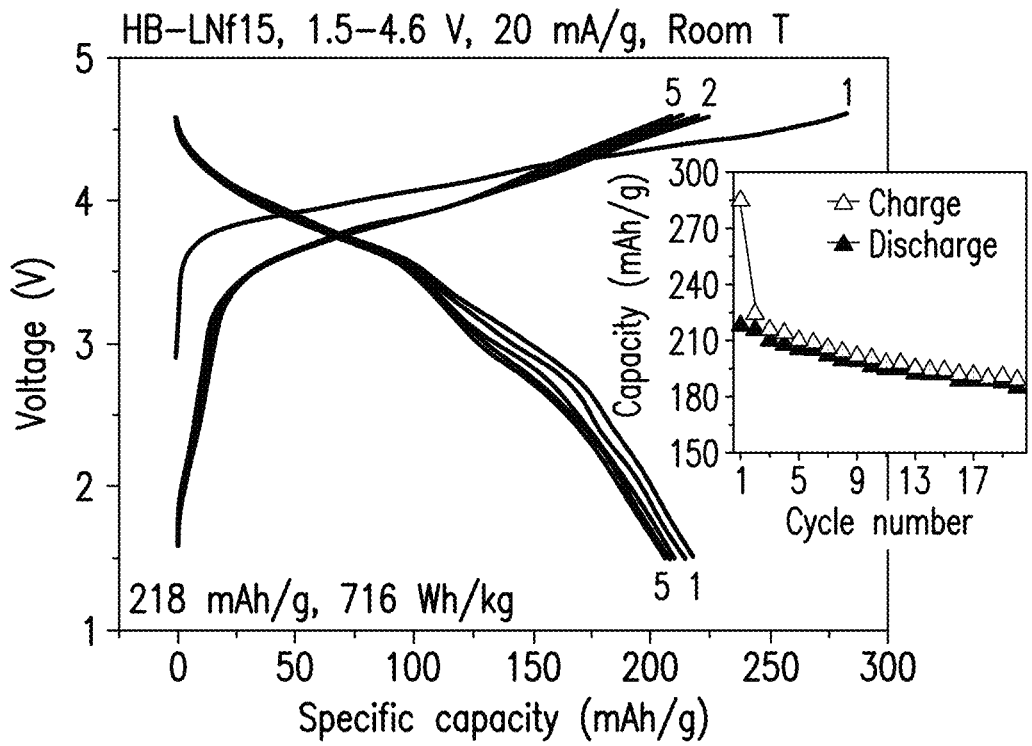

To the contrary, as shown in FIGS. 5C and 5D, Inventive LNF15 and Inventive HB-LNF15 can cycle with reduced polarization, which allows for the delivery of a high discharge capacity of 210 mAh/g (681 Wh/kg, 2894 Wh/l) and 218 mAh/g (716 Wh/kg, 3043 Wh/l), respectively. With the reduced polarization, the average discharge voltage also increases to approximately 3.25 V for both Inventive LNF15 and Inventive HB-LNF15.

Polarization Tests

Figure 6A:
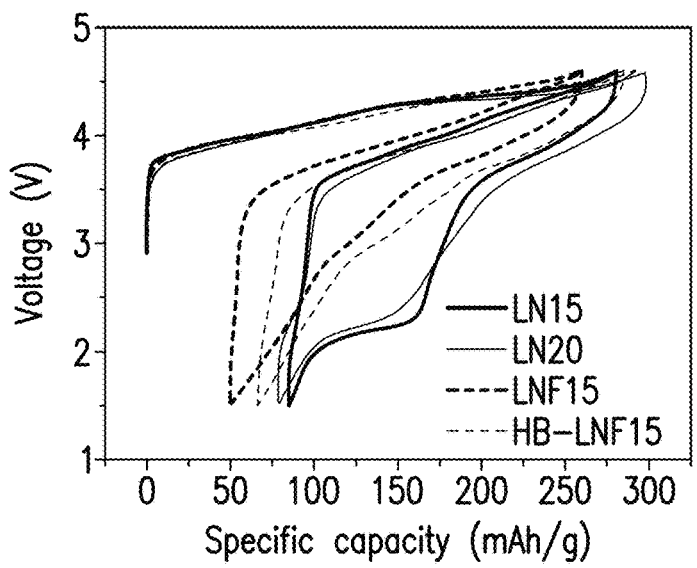
FIG. 6A shows the first-cycle and second-charge voltage profiles of Comparative LN15, Comparative LN20, Inventive LNF15, and Inventive HB-LNF15.

To more directly compare polarization in Inventive LNF15, Inventive HB-LNF15, Comparative LN15, and Comparative LN20, FIG. 5A shows the first-cycle and second-charge voltage profiles of each of the compounds. As shown in FIG. 6A, large voltage gaps can be seen between the middle of charge and discharge in Comparative LN15 and Comparative LN20. However, this voltage gap is reduced in Inventive LNF15 and becomes further reduced in Inventive HB-LNF15, showing that fluorination results in less polarization, particularly in the middle of charge and discharge.

Figure 6B:
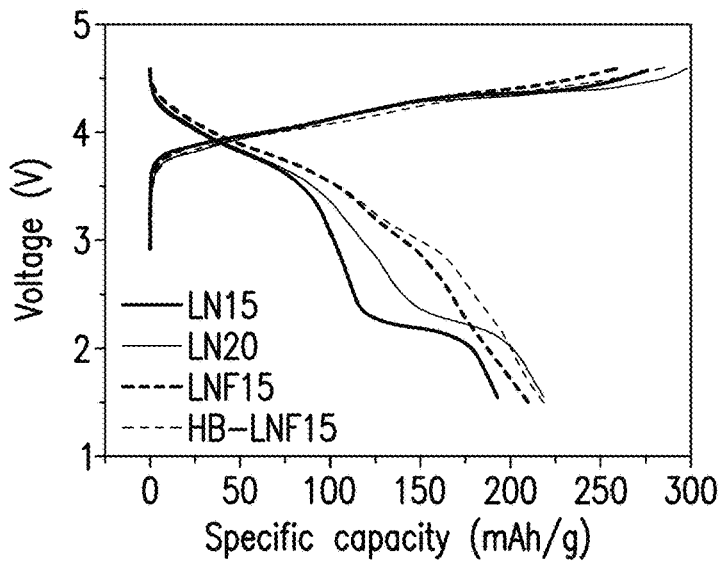
FIG. 6B shows the first-cycle voltage profiles of Comparative LN15, Comparative LN20, Inventive LNF15, and Inventive HB-LNF15.

FIG. 6B compares the first-cycle voltage profiles of each of the Inventive LNF15, Inventive HB-LNF15, Comparative LN15, and Comparative LN20 compounds. As shown in FIG. 6B, comparing Inventive HB-LNF15 and Comparative LN15, Inventive HB-LNF15 delivers 80 mAh/g higher discharge capacity above 2.5 V and 50 mAh/g higher discharge capacity above 3 V than Comparative LN15. Although, there is little change in the discharge capacity above 1.5 V (194 to 218 mAh/g).

Figure 6C:
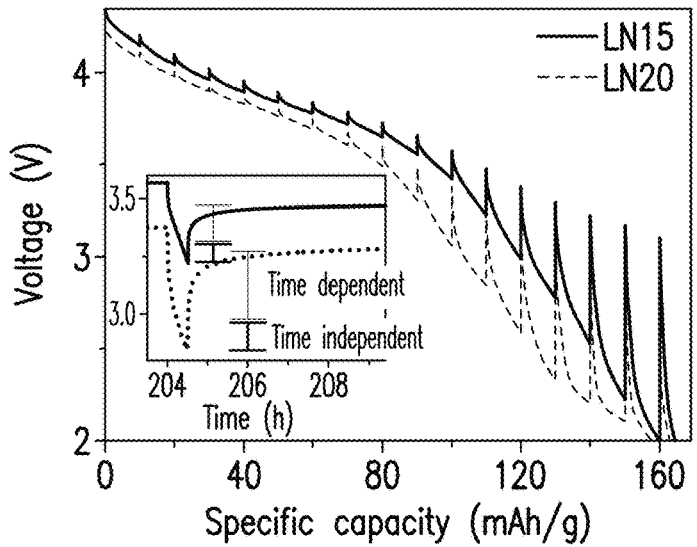
FIG. 6C shows the first-discharge voltage profiles of Comparative LN20 and Inventive LNF15 from galvanostatic intermittent titration tests ("GITT") after the first-charging to 270 mAh/g.
Figure 7A:
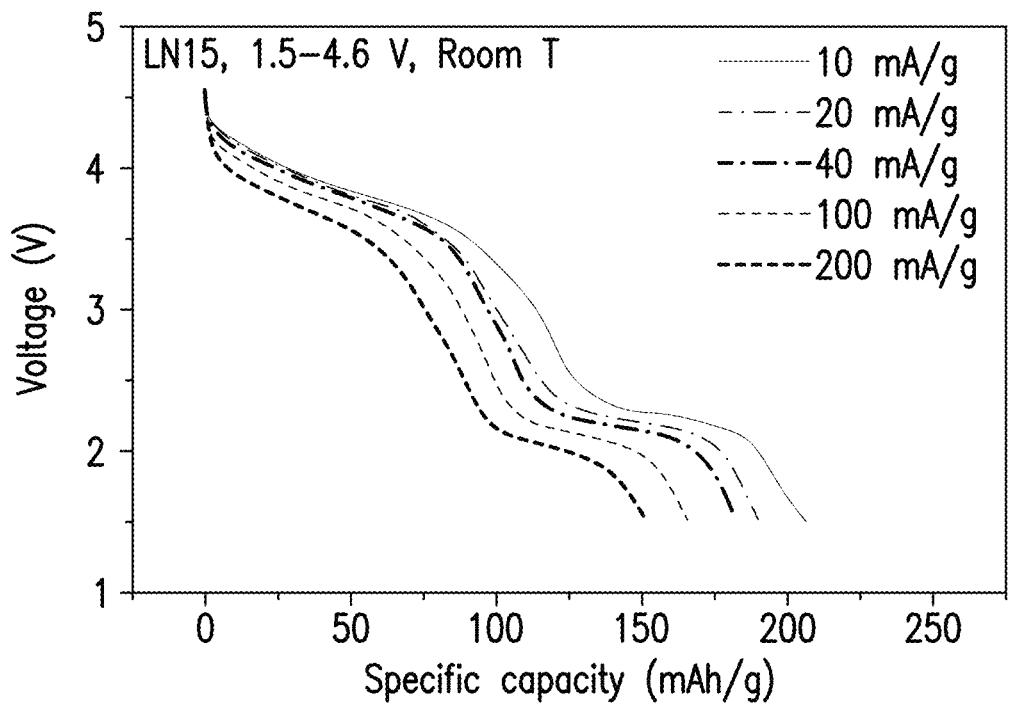
FIGS. 7A-7D show the discharge voltage profiles of Comparative LN15, Comparative LN20, Inventive LNF15, and Inventive HB-LNF15, respectively, when each of the compounds are charged at 20 mA/g and discharged at different rates of 10, 20, 40, 100, and 200 mA/g between 1.5 and 4.6 V at room temperature.
Figure 7B:
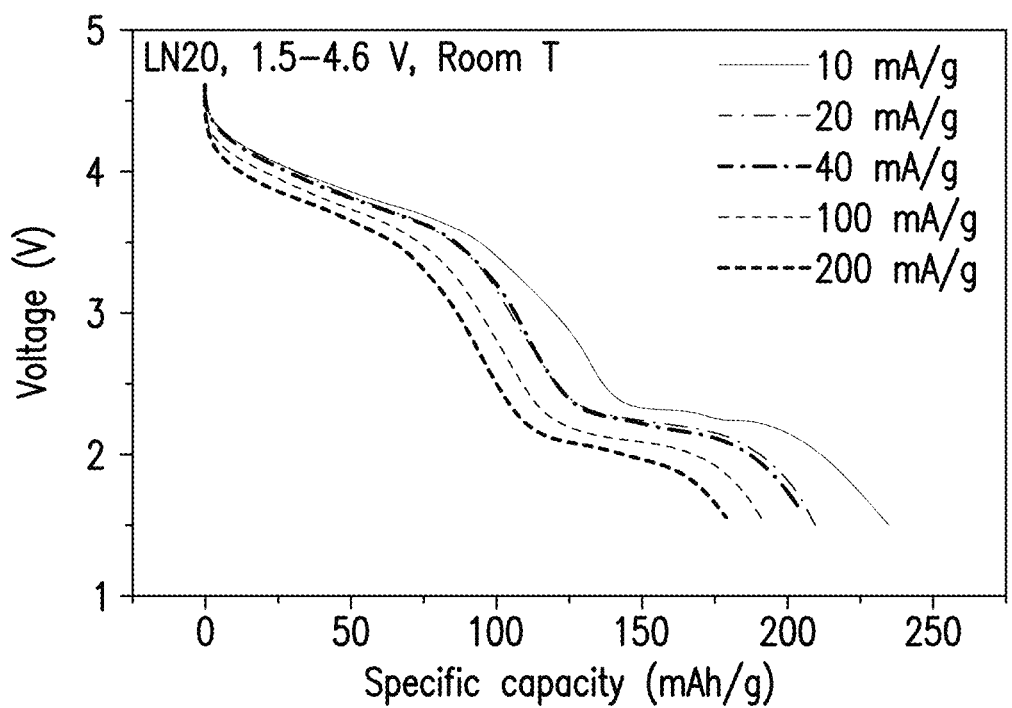
Figure 7C:
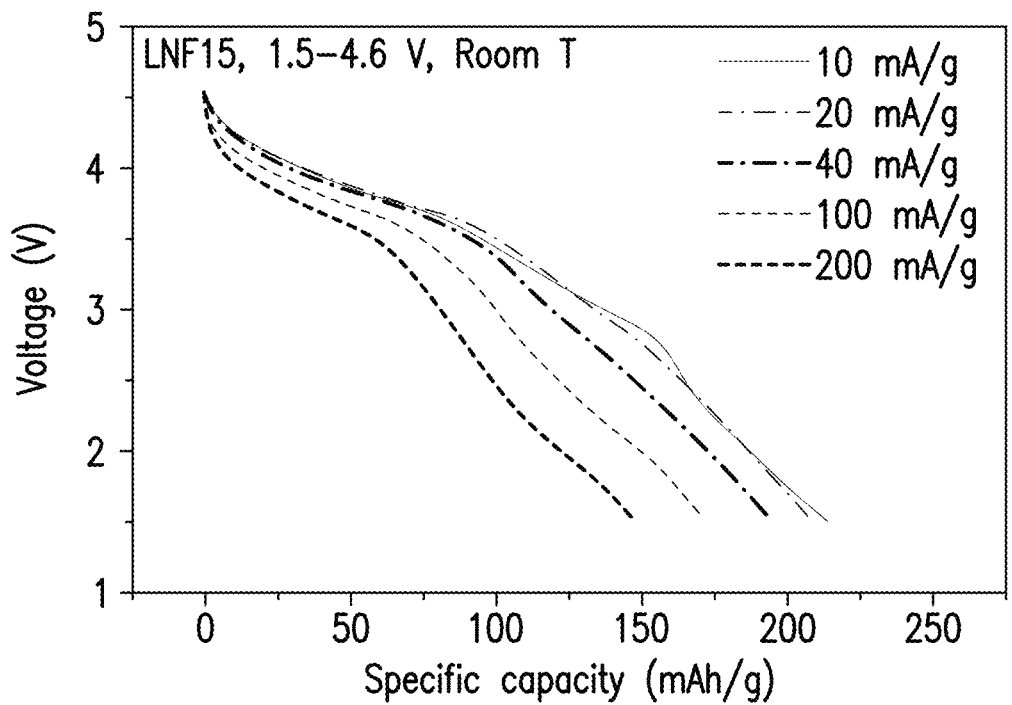
Figure 7D:
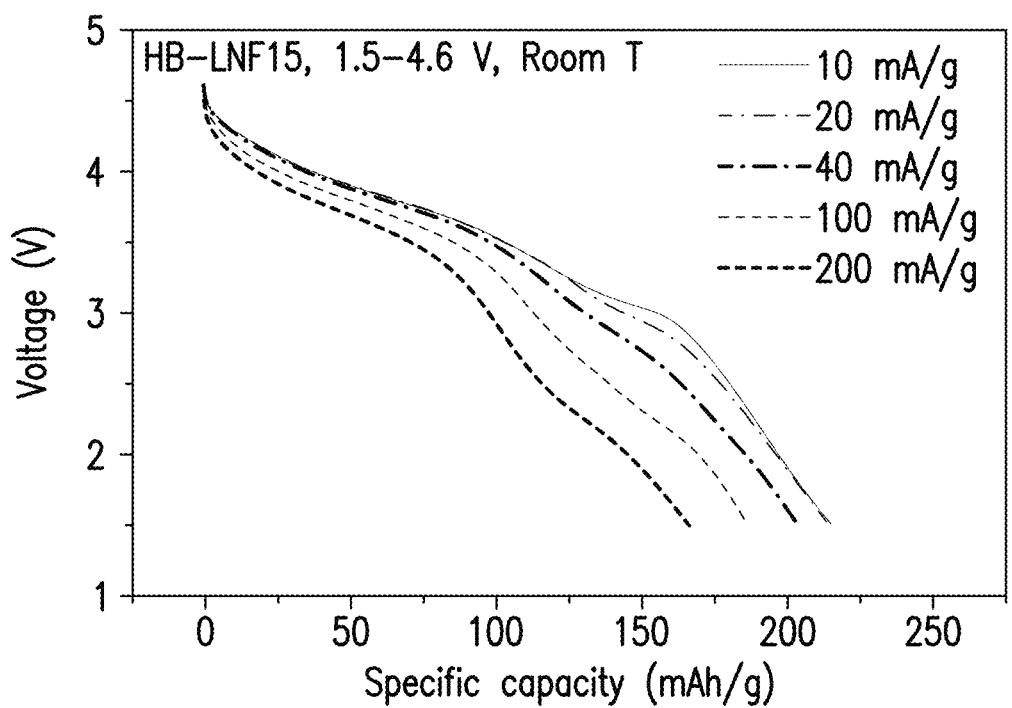

Galvanostatic intermittent titration tests ("GITT") were also conducted to analyze the nature of the reduced polarization in Inventive LNF15. For the tests, 10 mAh/g was galvanostatically charged or discharged per step at the rate of 20 mA/g. A five hour relaxation was given after each step. The total charge and discharge capacity was 250 mAh/g each. FIG. 6C shows the first-discharge voltage profiles of Comparative LN20 and Inventive LNF15 from the GITT after the first-charging to 270 mAh/g. The inset of FIG. 6C shows the voltage-time GITT profiles around 206 hours corresponding to the discharge capacity of approximately 110 mAh/g in the voltage-capacity plot.

As demonstrated in FIG. 6C, the voltage-capacity GITT profiles show that the vertical shift (relaxation) after each discharge step is reduced in Inventive LNF15 when compared to Comparative LN20, particularly in the middle of discharge. The voltage-time profiles in the inset of FIG. 6C show that the time-dependent portion of voltage relaxation is much smaller in Inventive LNF15 compared to Comparative LN20. This indicates that mass-transfer resistance from slow Li diffusion becomes alleviated in Inventive LNF15, resulting in reduced polarization.

Rate Capability Tests

Rate-capability tests were performed to further investigate the kinetics in each of the Inventive LNF15, Inventive HB-LNF15, Comparative LN15, and Comparative LN20 compounds. FIGS. 7A-7D show the discharge voltage profiles of Comparative LN15 (FIG. 7A), Comparative LN20 (FIG. 7B), Inventive LNF15 (FIG. 7C), and Inventive HB-LNF15 (FIG. 7D) when each of the compounds are charged at 20 mA/g and discharged at different rates of 10, 20, 40, 100, and 200 mA/g between 1.5 and 4.6 V at room temperature.

As can be seen in FIGS. 7A-7D, as the discharge rate increases from 10 to 200 mA/g, the discharge capacity decreases from 206 to 151 mAh/g for Comparative LN15, from 234 to 180 mAh/g for Comparative LN20, from 214 to 148 mAh/g for Inventive LNF15, and from 216 to 167 mAh/g for Inventive HB-LNF15. Comparing the rate capability of Comparative LN15, Comparative LN20, and Inventive HB-LNF15 (all having comparable particle sizes), it can be seen, that although their rate capabilities are not very different, the reduced polarization in the middle of discharge results in a higher energy density of Inventive HB-LNF than Comparative LN15 or Comparative LN20 at a same rate. For example, if discharging at 100 mA/g, the energy density delivered by Inventive HB-LNF is 592 Wh/kg, while the energy density delivered by Comparative LN15 is 493 Wh/kg and the energy density delivered by Comparative LN20 is 563 Wh/kg.

Differential Electrochemical Mass-Spectroscopy Measurements

Figure 8A:
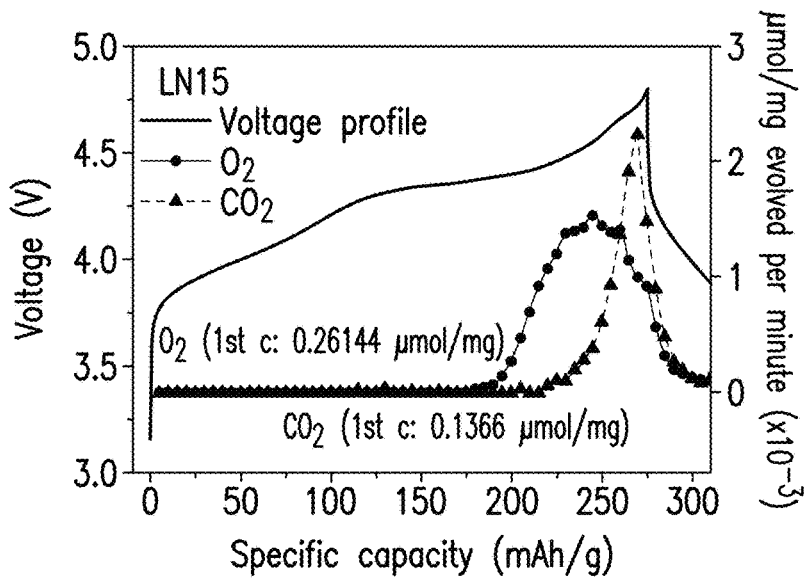
FIGS. 8A-8C show the voltage profiles of Comparative LN15, Comparative LN20, and Inventive LNF15, respectively, when charged to 4.8 V then discharged to 1.5 V at 20 mA/g as well as the differential electrochemical mass-spectroscopy results on oxygen and carbon dioxide.
Figure 8B:
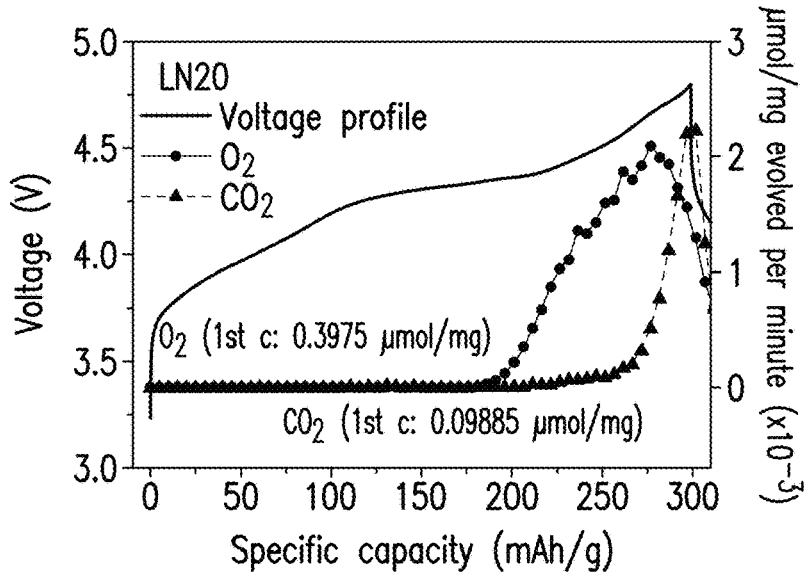
Figure 8C:
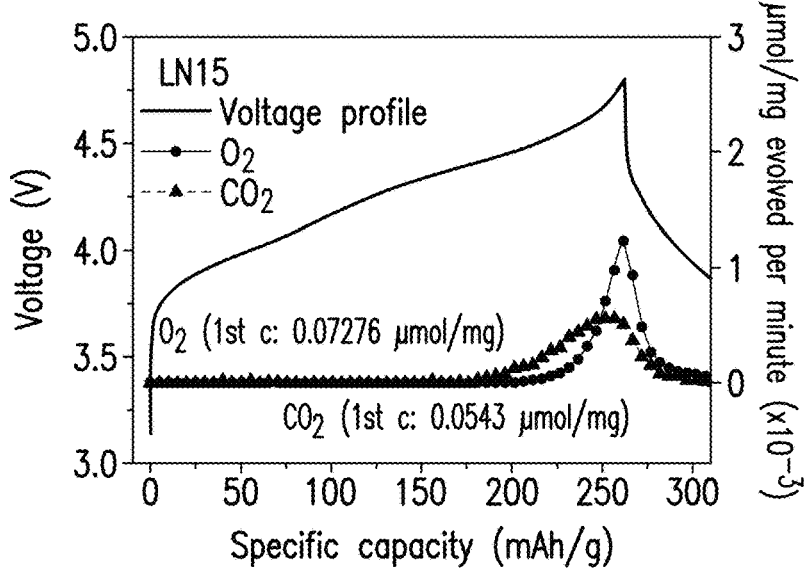

Differential electrochemical mass-spectroscopy (DEMS) measurements were performed on Comparative LN15, Comparative LN20, and Inventive LNF15. For the tests, each of the compounds was cycled between 1.5 and 4.8 V at 20 mA/g at room temperature. FIGS. 8A-8C show the voltage profiles of Comparative LN15 (FIG. 8A), Comparative LN20 (FIG. 8B), and Inventive LNF15 (FIG. 8C) when charged to 4.8 V then discharged to 1.5 V at 20 mA/g as well as the differential electrochemical mass-spectroscopy results on oxygen and carbon dioxide. As demonstrated by FIGS. 8A-8C, Inventive LNF15 experiences less oxygen loss than Comparative LN15 and Comparative LN20. Upon first charge to 4.8 V, oxygen gas starts to evolve after approximately 4.35 V (about 185 mAh/g) for both Comparative LN15 and Comparative LN20. That is, FIGS. 8A and 8B show oxygen loss from Comparative LN15 and Comparative LN20 when charged above approximately 4.35 V. However, the evolution of oxygen gas is delayed to above approximately 4.5 V (about 220 mAh/g) for Inventive LNF15. Thus, Inventive LNF15 shows less oxygen loss when compared to Comparative LN15 and Comparative LN20.

Moreover, the total amount oxygen evolution after the first charge is also decreased from 0.26144 µmol/mg and 0.3975 µmol/mg (µmol of gas species per mg of active material) for Comparative LN20 and Comparative LN15, respectively, to 0.07276 µmol/mg for Inventive LNF15. These amounts of oxygen gas evolution correspond to the loss of 2.341, 3.523, and 0.7142% of the total oxygen contents in Comparative LN15, Comparative LN20, and Inventive LNF15, respectively. Additionally, oxygen gas evolution occurs during the very initial portion of discharge. Thus, the total amount of oxygen gas evolution further increases to 0.3010, 0.4918 and 0.0915 mol/mg for Comparative LN15, Comparative LN20, and Inventive LNF15, respectively.

Evolution of carbon dioxide gas upon first charge is also shown in FIGS. 8A-8C. As seen in FIGS. 8A-8C, carbon dioxide gas evolves above approximately 4.4 V in all cases. However, at above 4.6 V, the rate of carbon dioxide gas evolution (µmol/mg per minute) is much lower for Inventive LNF15 than Comparative LN15 and Comparative LN20.

In-Situ XRD Comparison

Figure 9A:
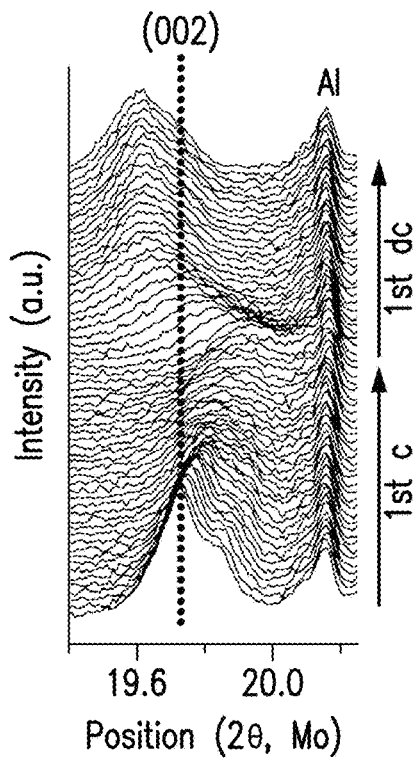
FIG. 9A shows the in situ XRD pattern of Comparative LN20.

To study the effect of fluorine substitution on the structural changes upon cycling, in situ XRD was performed on Comparative LN20 and Inventive LNF15. The in situ cells were cycled at 10 mA/g at room temperature between 1.5-4.6 V. The in situ XRD patterns of Comparative LN20 and Inventive LNF15 are shown in FIGS. 9A and 9C, respectively. The voltage profile (represented by the solid black line) and lattice parameters from rietveld refinements (represented by the black dotted line) of Comparative LN20 and Inventive LNF15 are shown in FIGS. 9B and 9D, respectively.

From FIGS. 9A and 9C, it can be seen that the (002) peak shifts to a higher angle upon charge and to a lower angle upon discharge for both Comparative LN20 and Inventive LNF15. This indicates that the lattice parameter decreases in charge and increases in discharge for both Comparative LN20 and Inventive LNF15. More specifically, the lattice parameter of Comparative LN20 decreases from 4.145 Å to 4.103 Å and then increases to 4.1707 Å, while the lattice parameter of Inventive LNF15 decreases from 4.1411 Å to 4.1023 Å and then increases to 4.1581 Å. These measurements correspond to the volume change of 3% upon first charge and +5% upon first discharge for Comparative LN20, and 2.8% upon first charge and +4.1% upon first discharge for Inventive LNF15. The lattice parameter and volume irreversibly increase after the first cycle by +0.62% (+1.87% in volume) for Comparative LN20 and +0.41% (+1.24% in volume) for Inventive LNF15.

Figure 9B:
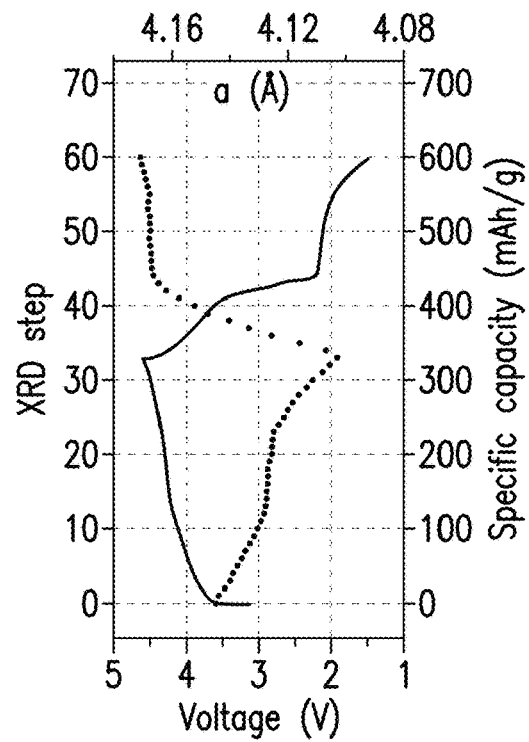
FIG. 9B shows the voltage profile and lattice parameters from Rietveld refinements of Comparative LN20.
Figure 9C:
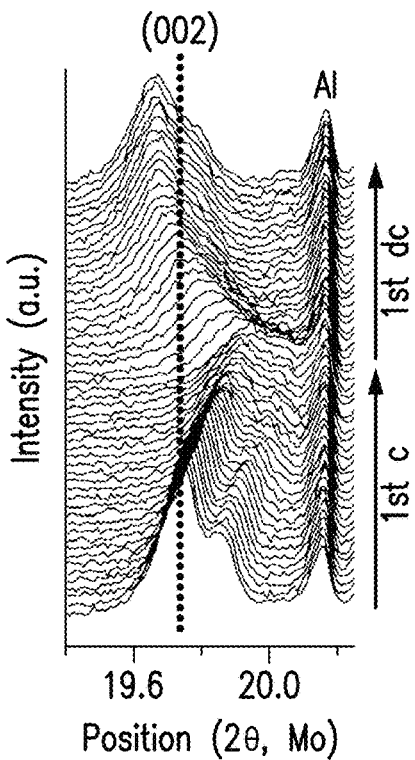
FIG. 9C shows the in situ XRD pattern of Inventive LNF15.
Figure 9D:
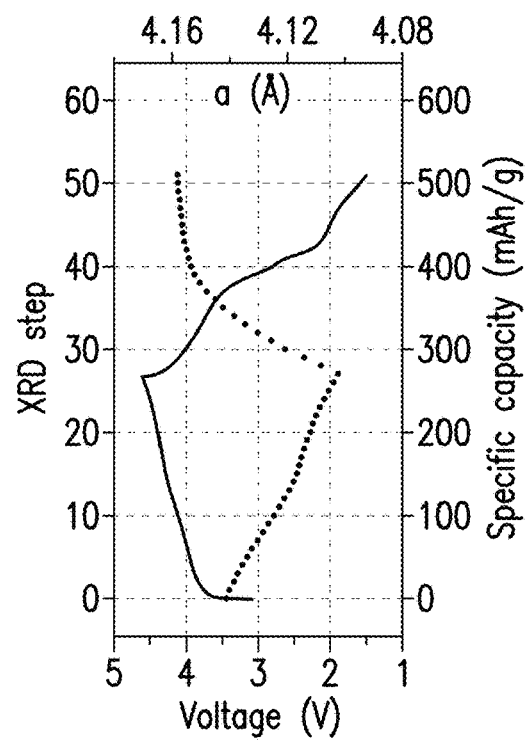
FIG. 9D shows the voltage profile and lattice parameters from Rietveld refinements of Inventive LNF15.

As shown in FIGS. 9B and 9D, the greatest difference in the behavior of Comparative LN20 and Inventive LNF15 is observed in the middle of the first charge. After charging Comparative LN20 beyond approximately 120 mAh/g, the lattice parameter barely decreases up to the charge of approximately 215 mAh/g. However, such behavior is not pronounced in Inventive LNF15.

Soft X-Ray Absorption Spectroscopy Tests

Figure 10A:
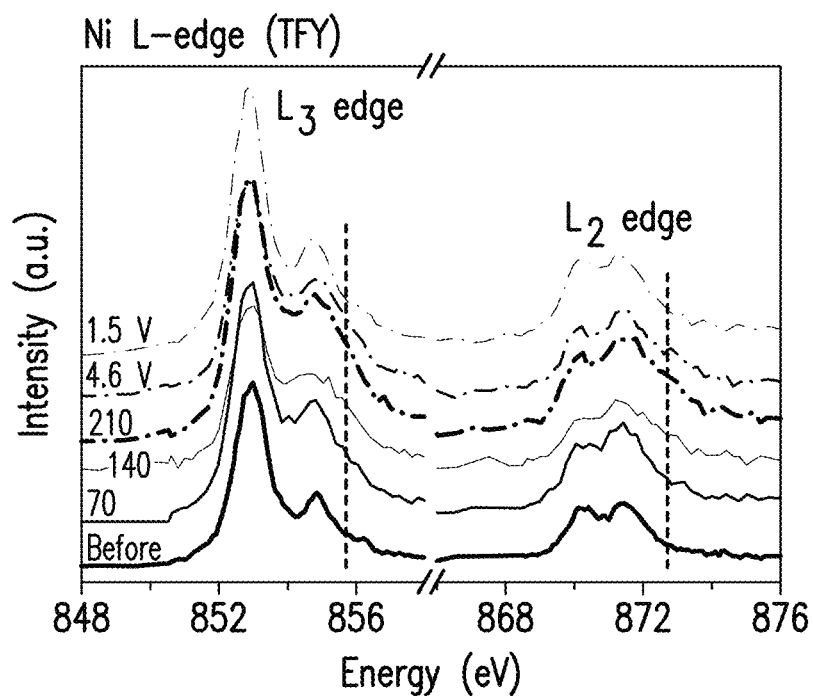
FIG. 10A shows the soft X-ray absorption spectra ("sXAS") on the Ni L-edge of Inventive HB-LNF15 using "bulk-sensitive" total fluorescence yield ("TFY") mode.
Figure 10B:
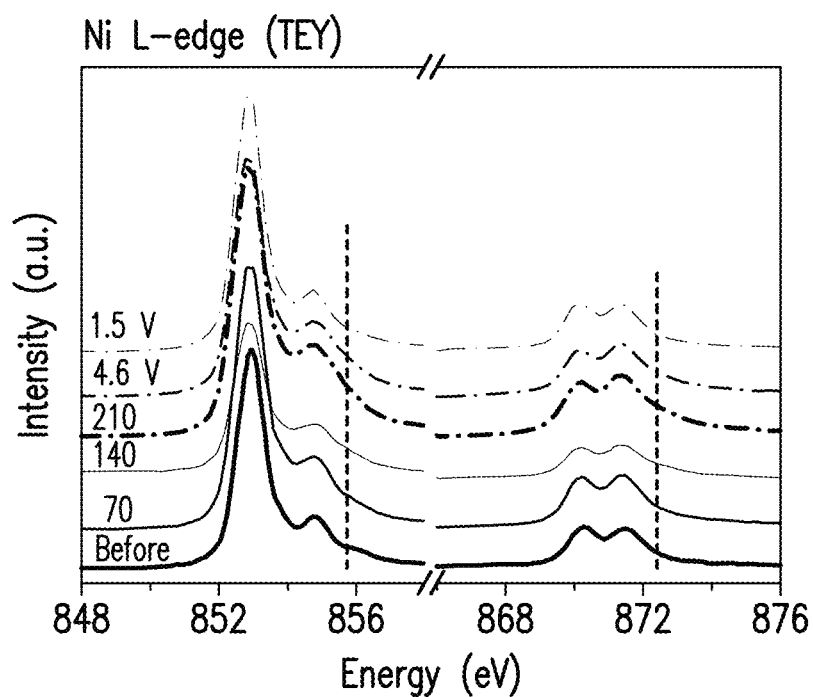
FIG. 10B shows the sXAS on the Ni L-edge of Inventive HB-LNF15 using the "surface-sensitive" total electron yield ("TEY") mode.
Figure 10C:
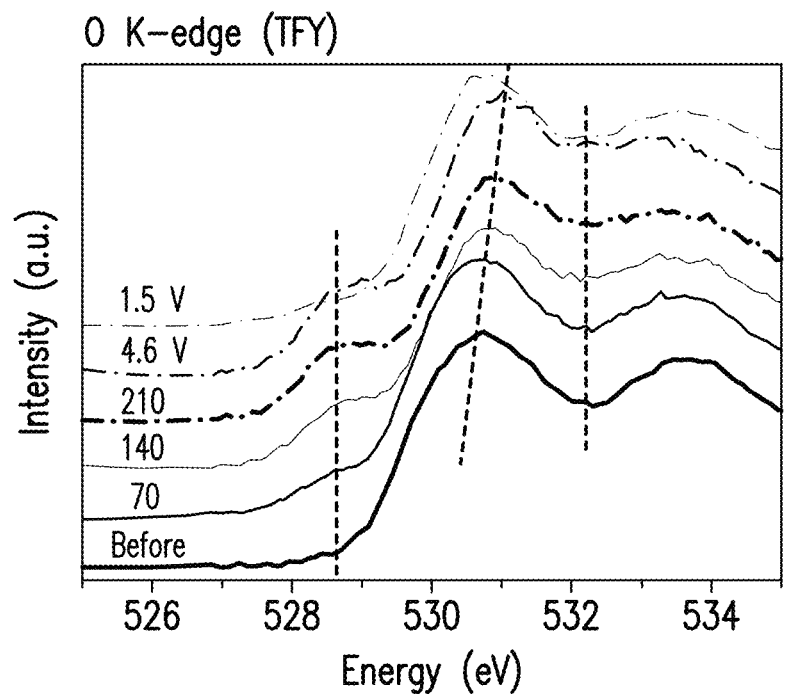
FIG. 10C shows the sXAS on the O K-edge of Inventive HB-LNF15 using the TFY mode.
Figure 10D:
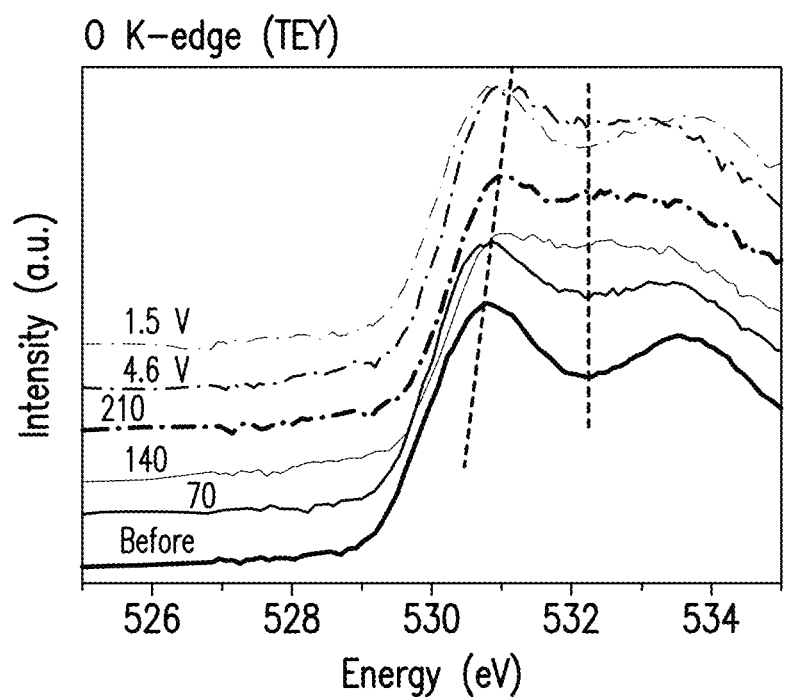
FIG. 10D shows the sXAS tests on the O K-edge of Inventive HB-LNF15 using the TEY mode.

To study the redox mechanism of Inventive HB-LNF15, soft X-ray absorption spectroscopy ("sXAS") tests were performed on Inventive HB-LNF15 using "bulk-sensitive" total fluorescence yield (TFY) mode and "surface-sensitive" total electron yield (TEY) mode. The Ni L-edge spectra and O K-edge spectra are shown in FIGS. 10A-10D. FIG. 10A shows the sXAS tests on the Ni L-edge of Inventive HB-LNF15 using the TFY mode. FIG. 10B shows the sXAS tests on the Ni L-edge of Inventive HB-LNF15 using the TEY mode. FIG. 10C shows the sXAS tests on the O K-edge of Inventive HB-LNF15 using the TFY mode. FIG. 10D shows the sXAS tests on the O K-edge of Inventive HB-LNF15 using the TEY mode. In these tests, data were collected before cycling Inventive HB-LNF15, after charging to 70 mAh/g, 140 mAh/g, 210 mAh/g, 4.6 V (~280 mAh/g), and after discharging to 1.5 V. Inventive HB-LNF15 was cycled at 20 mA/g at room temperature.

FIGS. 10A and 10B show the Ni L-edge spectra of Inventive HB-LNF15 using TFY mode and TEY mode, respectively. Metal L-edge is caused by the excitation of metal 2p electrons to the unfilled 3d orbitals, and it can be divided into two regions: the $L_3$-edge at lower photon energy and the $L_2$-edge at higher energy, due to 2p core hole spin-orbital splitting.

From the Ni L-edge spectra from TFY mode (which is bulk sensitive) as shown in FIG. 10A, it can be seen that Ni $L_3$-edge spectra before cycling has the strongest peak at approximately 853 eV and a smaller peak at approximately 855 eV. The intensity ratio between the two peaks [=I(853 eV)/I(855 eV)] decreases upon charging to 70 mAh/g, 140 mAh/g, 210 mAh/g, and 4.6 V (approximately 280 mAh/g) and recovers to the ratio of pristine LNF15 after the first discharge to 1.5 V (approximately 225 mAh/g). In addition, the spectral weight of Ni $L_2$-edge at approximately 873 eV increases upon charge and decreases upon discharge. This shows that $Ni^{2+}$ in the bulk of the Inventive HB-LNF15 compound oxidizes toward $Ni^{3+}$ and $Ni^{4+}$ and reduces back to the $Ni^{2+}$ after discharge. Nonetheless, the change in the Ni L-edges is small and $Ni^{2+}$ signal is still strong even after charging to 4.6 V. This indicates that only a small portion of $Ni^{2+}/Ni^{4+}$ redox is utilized in Inventive HB-LNF15 during cycling.

From the Ni L-edge spectra from TEY mode (which is surface sensitive (~10 nm)) as shown in FIG. 10B, it can be seen that the change in the Ni edge is even smaller than that in the TFY mode. This shows that most of the Ni ions at the surface region stay as $Ni^{2+}$ during the cycle and participate very slightly in redox.

From the O K-edge spectra of Inventive HB-LNF15 (FIGS. 10C and 10D), it can be seen that $Ni^{2+}$ in the bulk is oxidized in charge, but the Ni at the surface barely gets oxidized. O K-edge is caused by the excitation of O 1s electrons to the unfilled O 2p states.

FIG. 10C shows the O K-edge spectra from TFY mode. As shown in FIG. 10C, a peak at approximately 528.5 eV grows upon charging to 4.6 V and disappears upon discharging. The peak growth at approximately 528.5 eV can be ascribed to partial $Ni^{2+}/Ni^{4+}$ oxidation in the bulk using Ni-dominating $e_g$* electrons, which partially leads to hole doping to O 2p states due to the covalent nature of the $e_g$* states. This Ni oxidation in the bulk is consistent with the slight spectral shift observed in Ni L-edge spectra from TFY mode (FIG. 10A). In addition, it is shown an increase of peak intensity between 530 eV to 535 eV especially after charging beyond 210 mAh/g. This shows that holes are introduced to O 2p states upon charging.

FIG. 10D shows the O K-edge spectra from TEY mode. Unlike the O K-edge spectra from TFY mode, there is a negligible peak growth at approximately 528.5 eV during charging. Instead, the intensity growth is observed between 530 eV to 535 eV, as in the O K-edges spectra from the TFY mode. This shows that, at the surface, $Ni^{2+}$ does not get oxidized much and that oxygen oxidation predominantly occurs, which is consistent to the negligible change in the Ni L-edges spectra from TEY mode.

Example 2

The following inventive fluorine substituted cation-disordered lithium metal oxide was synthesized:
Li—Ni—Ti—Mo—O—F type having the general formula: $Li_{1+x}Ni_aTi_bMo_{1-x-a-b}O_{2-y}F_y$, 0.05<x<0.3, 0.2<a<0.6, 0.2<b<0.6, 0<y≤0.3, where x=0.25, a=0.35, b=0.3, y=0.25 ($Li_{1.25}Ni_{0.35}Ti_{0.3}Mo_{0.1}O_{1.75}F_{0.25}$) ("Inventive L125NTMOF").

The Inventive L125NTMOF was synthesized using the same precursors and procedure as set forth in Example 1.

Figure 11A:
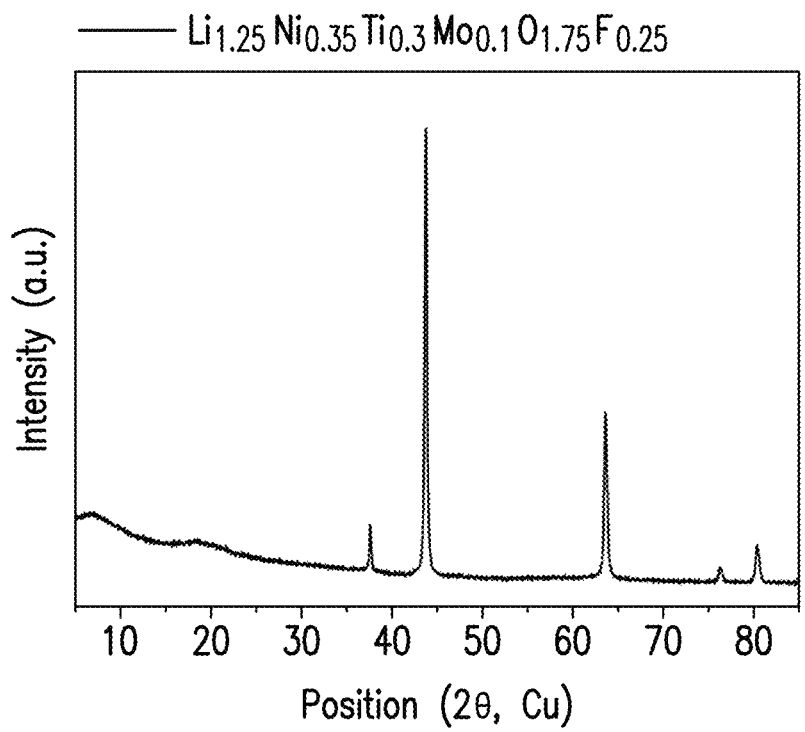
FIG. 11A shows the XRD pattern of $Li_{1.25}Ni_{0.35}Ti_{0.3}Mo_{0.1}O_{1.75}F_{0.25}$ ("Inventive L125NTMOF")
Figure 11B:
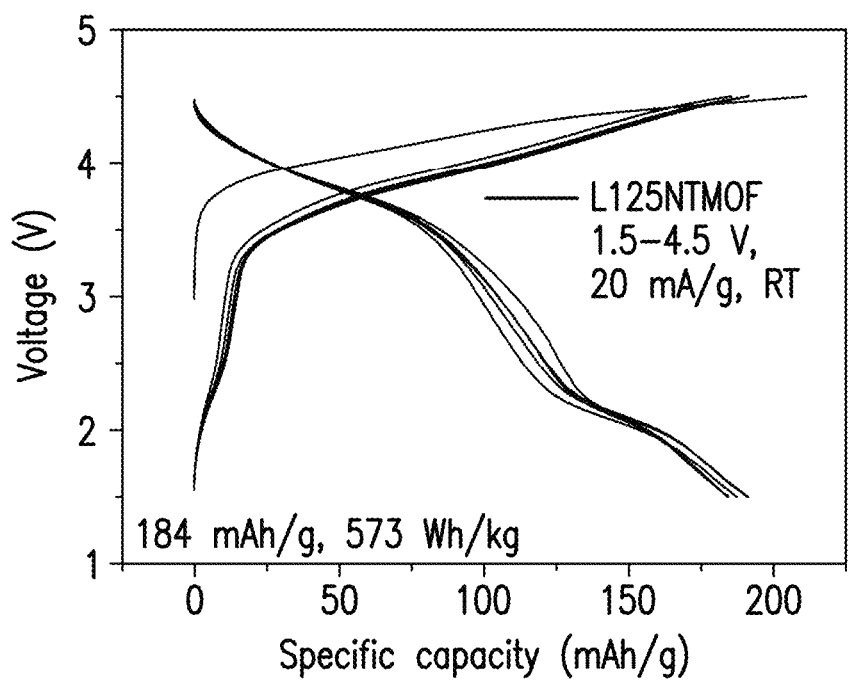
FIG. 11B shows the voltage profile of Inventive L125NTMOF when cycled between 1.5 and 4.5 V at 20 mA/g at room temperature.

FIG. 11A shows the X-ray diffraction ("XRD") pattern of Inventive L125NTMOF. FIG. 11B shows the voltage profile of Inventive L125NTMOF when cycled between 1.5 and 4.5 V at 20 mA/g at room temperature. As shown in FIG. 11B, Inventive L125NTMOF provides for a first discharge capacity of 184 mAh/g and an energy density of 573 Wh/kg.

Example 3

The following inventive fluorine substituted cation-disordered lithium metal oxide was synthesized:
Li—Ni—Nb—O—F type having the general formula: $Li_{1+x}Ni_aNb_bO_{2-y}F_y$, 0.05<x<0.3, 0.2<a<0.6, 0.2<b<0.6, 0≤y≤0.3, where x=0.2, a=0.5, b=0.3, y=0.3 ($Li_{1.2}Ni_{0.5}Nb_{0.3}O_{1.7}F_{0.3}$) ("Inventive L120NNOF").

Figure 12A:
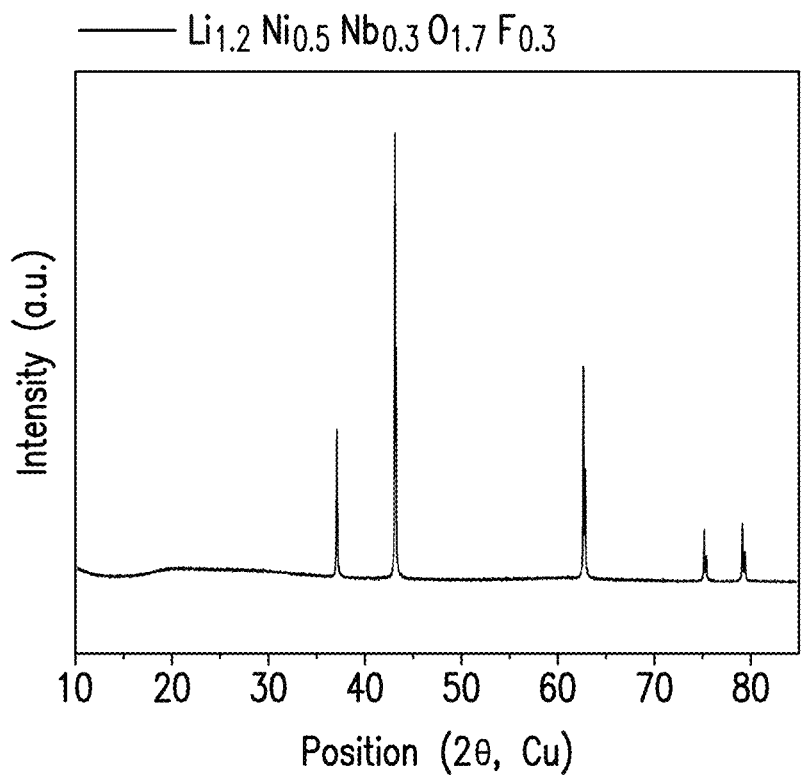
FIG. 12A shows the XRD pattern of $Li_{1.2}Ni_{0.5}Nb_{0.3}O_{1.7}F_{0.3}$ ("Inventive L120NNOF")
Figure 12B:
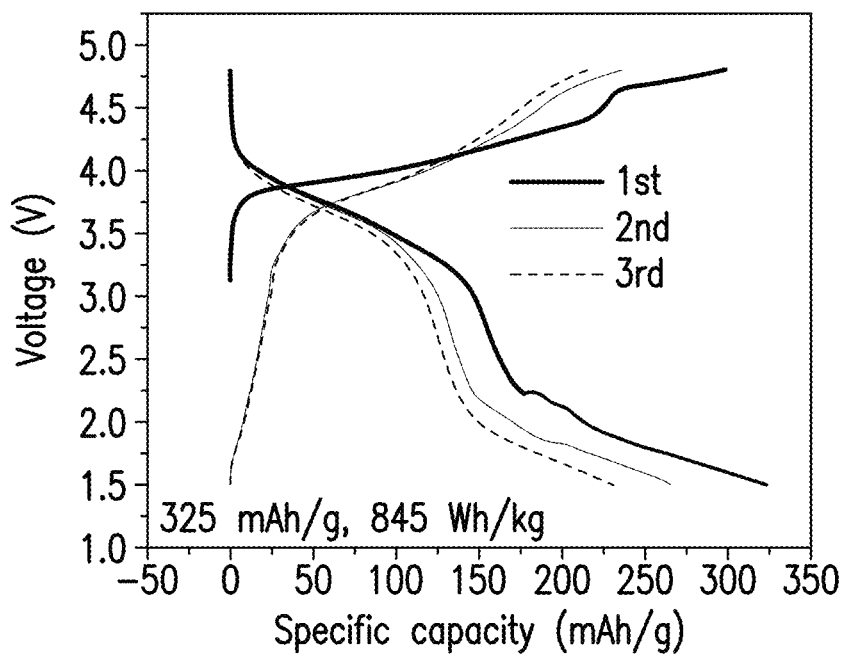
FIG. 12B shows the voltage profile of Inventive L120NNOF when cycled between 1.5 and 4.5 V at 20 mA/g at room temperature.

FIG. 12A shows the X-ray diffraction ("XRD") pattern of Inventive L120NNOF. FIG. 12B shows the voltage profile of Inventive L120NNOF when cycled between 1.5 and 4.5 V at 20 mA/g at room temperature. As shown in FIG. 12B, Inventive L120NNOF provides for a first discharge capacity of 325 mAh/g and an energy density of 845 Wh/kg.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. A lithium metal oxide having a general formula: $Li_{1+x}M_{1-x}O_{2-y}F_y$, said lithium metal oxide having a cation-disordered rocksalt structure, wherein either:
   a) $M_{1-x}$ comprises $Ni_aM'_b$, where $0.05 \leq x \leq 0.2$, $0 < y \leq 0.3$, and $0.35 \leq a \leq 0.50$, and $M'_b$ is one or more transition metals selected from the group consisting of Ti, Mo, Nb, Sb, Zr, and combinations thereof, and each transition metal $M'_b$ is separately present in an amount $0.10 \leq b \leq 0.30$; or
   b) $M_{1-x}$ comprises $Ni_aTi_bMo_c$, where $0.05 \leq x \leq 0.2$, $0 < y \leq 0.3$, $0.35 \leq a \leq 0.50$, $0.10 \leq b \leq 0.30$, and $0.10 \leq c \leq 0.30$.

2. The lithium metal oxide of claim 1, wherein $0.10 \leq y \leq 0.25$.

3. The lithium metal oxide of claim 1, wherein $0.09 \leq x \leq 0.2$.

4. The lithium metal oxide of claim 1, wherein M' is selected from the group consisting of Mo, Ni, Ti, and combinations thereof.

5. The lithium metal oxide of claim 1, having a formula: $Li_{1+x}Ni_aTi_bMo_{1-x-a-b}O_{2-y}F_y$.

6. The lithium metal oxide of claim 1, having an average particle size of about 10 nm to about 10 μm.

7. The lithium metal oxide of claim 1, having a cation-disordered rocksalt structure characterized by a crystallographic space group Fm-3$\overline{m}$.

8. The lithium metal oxide of claim 1, having a discharge capacity of about 180 mAh/g to about 330 mAh/g.

9. The lithium metal oxide of claim 1, having an average discharge voltage of at least 3.0 V.

10. A process for manufacturing a lithium metal oxide according to claim 1, the process comprising the steps of:
    providing a lithium-based precursor;
    providing a transition metal (M)-based precursor;
    providing a fluorine-based precursor;
    dispersing said lithium-based, transition metal-based, and fluorine-based precursors in an organic solvent so as to obtain a precursor slurry;
    milling said precursor slurry so as to obtain an average particle size of 10 nm to 10 μm;
    drying and pelletizing said precursor slurry;
    firing said precursor slurry at a temperature of at least 600° C. in the presence of oxygen.

11. The process of claim 10, wherein stoichiometric amounts of said lithium-based, transition metal-based, and fluorine-based precursors are dispersed into the solvent.

12. The process of any of claim 10, wherein the lithium-based precursor is $Li_2CO_3$ and the fluorine-based precursor is LiF.

13. The process of any of claim 10, wherein the organic solvent is selected from acetone or ethanol.

14. The process of any of claim 10, wherein the step of milling is selected from the group consisting of ball milling, shaker milling, and high energy ball milling.

15. The process of any of claim 10, wherein the precursor slurry is fired at a temperature of at least 700° C. for 10 hours in the presence of oxygen.

16. A positive electrode material, comprising:
    a lithium metal oxide of claim 1.

17. A lithium-ion battery, comprising:
    a negative electrode material;
    an electrolyte; and
    the positive electrode material according to claim 16.

18. The lithium metal oxide of claim 2, wherein M' is selected from the group consisting of Mo, Nb, Ti, and combinations thereof.

19. The lithium metal oxide of claim 3, wherein M' is selected from the group consisting of Mo, Nb, Ti, and combinations thereof.

20. The lithium metal oxide of claim 1, wherein said lithium metal oxide comprises fluorine that is substituted into a disordered lattice of the oxide without forming secondary phases.

21. A lithium metal oxide having a general formula: $Li_{1+x}M_{1-x}O_{2-y}F_y$, said lithium metal oxide having a cation-disordered rocksalt structure, wherein $M_{1-x}$ comprises $Ni_aM'_b$, $0.05 \leq x \leq 0.2$, $0 < y \leq 0.3$, and $0.35 \leq a \leq 0.50$, and $M'_b$ is one or more transition metals selected from the group consisting of Ti, Mo, Nb, Sb, Zr, and combinations thereof, and each transition metal $M'_b$ is separately present in an amount $0.10 \leq b \leq 0.30$; and
    wherein, when the plurality of transition metals M comprises Mo, then the plurality of transition metals comprises at least two additional transition metals.

22. The lithium metal oxide of claim 21, wherein $0.10 \leq y \leq 0.25$.

23. The lithium metal oxide of claim 21, wherein $0.09 \leq x \leq 0.2$.

24. The lithium metal oxide of claim 21, wherein M' is selected from the group consisting of Mo, Nb, Ti, and combinations thereof.

25. The lithium metal oxide of claim 21, having an average particle size of 10 nm to 10 μm.

26. The lithium metal oxide of claim 21, having a cation-disordered rocksalt structure characterized by a crystallographic space group Fm-3$\overline{m}$.

27. The lithium metal oxide of claim 21, having a discharge capacity of 180 mAh/g to 330 mAh/g.

28. The lithium metal oxide of claim 21, having an average discharge voltage of at least 3.0V.

29. The lithium metal oxide of claim 21, wherein said lithium metal oxide comprises fluorine that is substituted into a disordered lattice of the oxide without forming secondary phases.

30. A positive electrode material, comprising:
    a lithium metal oxide of claim 21.